US010891509B2

(12) United States Patent
Doumbouya et al.

(10) Patent No.: US 10,891,509 B2
(45) Date of Patent: Jan. 12, 2021

(54) METHOD AND SYSTEM FOR FACILITATING IDENTIFICATION OF AN OBJECT-OF-INTEREST

(71) Applicant: Avigilon Corporation, Vancouver (CA)

(72) Inventors: Moussa Doumbouya, Melrose, MA (US); Lu He, Woburn, MA (US); Yanyan Hu, Medford, MA (US); Mahesh Saptharishi, Sudbury, MA (US); Hao Zhang, Winchester, MA (US); Nicholas John Alcock, Vancouver (CA); Roger David Donaldson, Vancouver (CA); Seyedmostafa Azizabadifarahani, Vancouver (CA); Ken Jessen, New Westminster (CA)

(73) Assignee: Avigilon Corporation, Vancouver (CA)

(*) Notice: Subject to any disclaimer, the term of this patent is extended or adjusted under 35 U.S.C. 154(b) by 111 days.

(21) Appl. No.: 16/172,557

(22) Filed: Oct. 26, 2018

(65) Prior Publication Data
US 2019/0130202 A1 May 2, 2019

Related U.S. Application Data

(60) Provisional application No. 62/578,237, filed on Oct. 27, 2017, provisional application No. 62/655,702, filed on Apr. 10, 2018.

(51) Int. Cl.
G06K 9/32 (2006.01)
G06N 20/00 (2019.01)
(Continued)

(52) U.S. Cl.
CPC ....... *G06K 9/3241* (2013.01); *G06K 9/00288* (2013.01); *G06K 9/00369* (2013.01);
(Continued)

(58) Field of Classification Search
CPC ............ G06K 9/3241; G06K 9/00288; G06K 9/00369; G06K 9/00771; G06N 20/00; H04N 7/181
See application file for complete search history.

(56) References Cited

U.S. PATENT DOCUMENTS

2007/0237364 A1* 10/2007 Song .................. G06K 9/00369
382/115
2017/0032204 A1* 2/2017 Tiwari ............... G06K 9/00771
(Continued)

OTHER PUBLICATIONS

Chen, S.Z., Guo, C.C. and Lai, J.H., 2016. Deep ranking for person re-identification via joint representation learning. IEEE Transactions on Image Processing, 25(5), pp. 2353-2367.*
(Continued)

*Primary Examiner* — Zhitong Chen
(74) *Attorney, Agent, or Firm* — Daniel Hammond

(57) ABSTRACT

There are described methods and systems for facilitating identification of an object-of-interest. A face similarity score and a body similarity score of a query image relative to a gallery image are determined. A fused similarity score of the query image relative to the gallery image is determined by applying a relationship between the face similarity score, the body similarity score, and the fused similarity score. The fused similarity score is indicative of whether or not the object-of-interest and the potential object-of-interest are the same object-of-interest. For example, a machine learning process is used to fuse the face similarity score and the body similarity into the fused similarity score. The process is repeated for multiple gallery images. The gallery images may then be ranked according to their respective fused similarity scores.

42 Claims, 25 Drawing Sheets

(51) Int. Cl.
G06K 9/00 (2006.01)
H04N 7/18 (2006.01)
(52) U.S. Cl.
CPC ......... *G06K 9/00771* (2013.01); *G06N 20/00* (2019.01); *H04N 7/181* (2013.01)

(56) References Cited

U.S. PATENT DOCUMENTS

2017/0193284 A1* 7/2017 Yoon ................ G06K 9/00248
2018/0137892 A1* 5/2018 Ding ................ G06K 9/00744
2018/0253596 A1   9/2018 Barman et al.

OTHER PUBLICATIONS

A. Barman and S.K. Shah, "Distance Aggregation Based Score Fusion for Improving Person Re-identification", 2017 IEEE International Symposium on Technologies for Homeland Security (HST), Apr. 25-26, 2017.

A. Barman and S.K. Shah, "Improving Person Re-Identification Systems: a Novel Score Fusion Framework for Rank-n Recognition", Proceedings of the Tenth Indian Conference on Computer Vision, Graphics and Image Processing, Guwahati, India, Dec. 18-22, 2016, Article No. 4.

A. Jain, K. Nandakumar, and A. Ross, "Score Normalization in Multimodal Biometric Systems", Pattern Recognition, vol. 38(12): pp. 2270-2285, Dec. 2005.

A. K. Jain and A. Ross, "Learning User-Specific Parameters in a Multibiometric System", Proceedings. International Conference on Image Processing (ICIP), Rochester, New York, Sep. 22-25, 2002.

F.M. Alkoot and J. Kittler, "Experimental Evaluation of Expert Fusion Strategies", Pattern Recognition Letters, vol. 20 (11-13): pp. 1361-1369, Nov. 1999.

Wikipedia, "Chinese Whispers (Clustering Method)", revised Jul. 27, 2017, available at https://en.wikipedia.org/w/index.php?title=Chinese_Whispers_(clustering_method)&oldid=792670572.

Wikipedia, "Graph Partition", revised Oct. 24, 2017, available at https://en.wikipedia.org/w/index.php?title=Graph_partition&oldid=806849233.

J. Kittler, M. Hatef, R. P. Duin, and J. Matas, "On combining classifiers", Pattern Analysis and Machine Intelligence, IEEE Transactions on, 20(3):226-239, 1998.

K. Nandakumar, Y. Chen, S. C. Dass, and A. Jain, "Likelihood Ratio-Based Biometric Score Fusion", IEEE Transactions on Pattern Analysis and Machine Intelligence, vol. 30(2): pp. 342-347, Feb. 2008.

L. Zheng, S. Wang, L. Tian, F. He, Z. Liu, and Q. Tian, "Query-Adaptive Late Fusion for Image Search and Person Re-identification", in 2015 IEEE Conference on Computer Vision and Pattern Recognition (CVPR), Jun. 7-12, 2015.

M. Farenzena, L. Bazzani, A. Perina, V. Murino, and M. Cristani, "Person Re-Identification by Symmetry-Driven Accumulation of Local Features", in 2010 IEEE Computer Society Conference on Computer Vision and Pattern Recognition (CVPR), Jun. 13-18, 2010.

O. R. Terrades, E. Valveny, and S. Tabbone, "Optimal Classifier Fusion in a Non-Bayesian Probabilistic Framework", IEEE Trans Pattern Analysis and Machine Intelligence, vol. 31(9):1630-1644, Sep. 2009.

R. Zhao, W. Ouyang, and X. Wang, "Person Re-Identification by Salience Matching", 2013 IEEE International Conference on Computer Vision (ICCV), Dec. 1-8, 2013.

R. Zhao, W. Ouyang, and X. Wang, "Learning Mid-Level Filters for Person Re-Identification", 2014 IEEE Conference on Computer Vision and Pattern Recognition (CVPR), Jun 23-28, 2014.

A. Barman and S.K. Shah, "SHaPE: A Novel Graph Theoretic Algorithm for Making Consensus-based Decisions in Person Re-Identification Systems", 2017 IEEE International Conference on Computer Vision (ICCV), Oct. 22-29, 2017.

A. Barman and S.K. Shah, "Unsupervised Posterior Probability Estimation for Score Fusion in Person Re-Identification Systems", Quantitative Imaging Lab, Department of Computer Science, University of Houston, Apr. 15, 2016, <http://csphdshowcase.nsm.uh.edu/previous/2016/program>.

* cited by examiner

| Appearance Search Options | ✕ |
|---|---|
| Appearance Description | Male, Jeans, T-Shirt, Red ⌄ |

Type: ⦿ Persons ○ Vehicles

Gender: ☐ Female ☑ Male

Age: [Any ▸]

Clothing Type: [Jeans, T-Shirt ▸]

Clothing Color & Pattern: [Red ▸]

Hair Color: [Any ▸]

Footwear Color: [Any ▸]

Accessories: [Any ▸]

Date Range: 2016-05-30 / 08:13:46PM ⊙ 2016-05-30 / 8:37:46PM ⌄

Cameras All ⌄

[Search] [Cancel]

FIG. 10B

| Search Options | × |
|---|---|
| We found various results matching your description: | |
| You searched for: A man wearing a red t-shirt and jeans ← 1108 | |

| 👤 Appearances | 99+ Results < |
|---|---|
| Gender: | ☐ Female ☑ Male ← 1016 |
| Age: | Any ▶ ← 1018 |
| Clothing Type: | Jeans, T-Shirt ▶ |
| Clothing Color & Pattern: | Red ▶ |
| Hair Color: | Any ▶ |
| | Search Cancel ← 1006 |

| 📶 Motion | 99+ Results > |
| ⓘ Events | 99+ Results > |
| 🚗 LPR | 99+ Results > |

Appearance Search Options — 1004

Personal Characteristics

Gender

Age ☐ 0-12  ☐ 20-60
    ☐ 13-19 ☐ 61+

Hair

Clothing

Date Range  2016-05-30/08:13:46PM ⬆ 2016-05-30/08:13:46PM   15

Cameras (Avigilon Engineering)

[Search] [Cancel]

FIG. 12B

Appearance Search Options — 1004

Personal Characteristics

Clothing

Upper Body

Lower Body

Footwear Color

Date Range  2016-05-30/08:13:46PM ⬆ 2016-05-30/08:13:46PM   15

Cameras (Avigilon Engineering)

[Search] [Cancel]

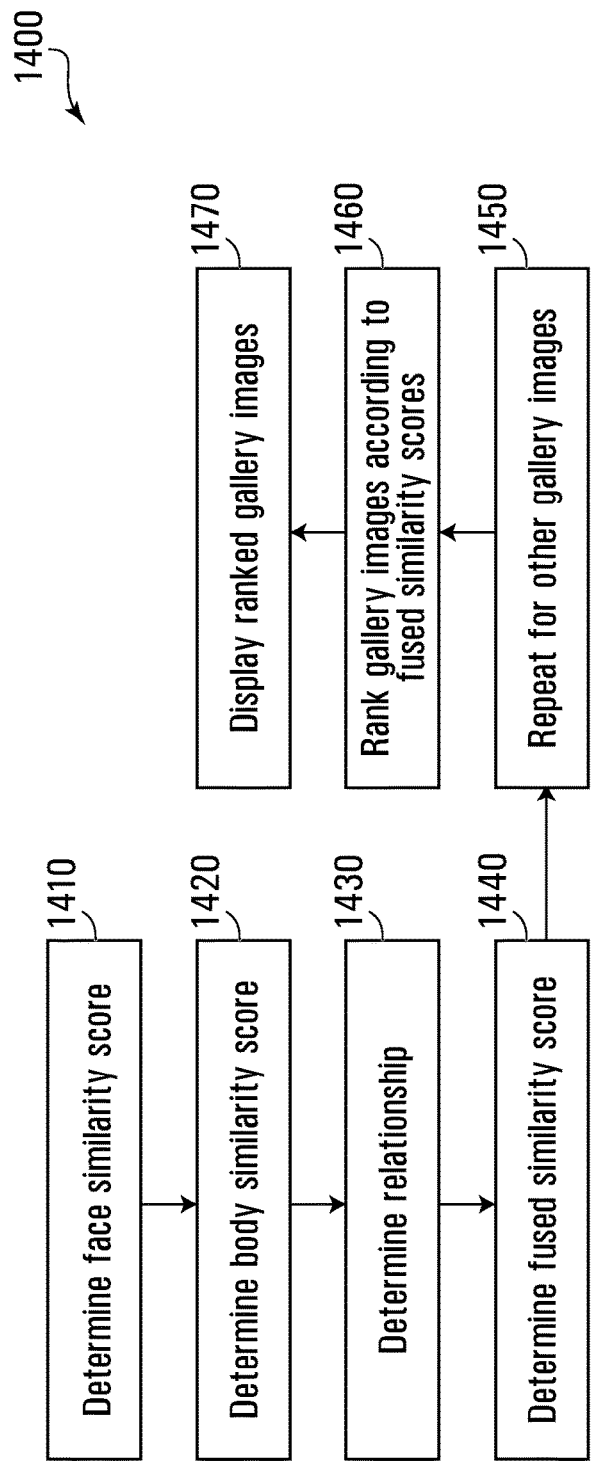
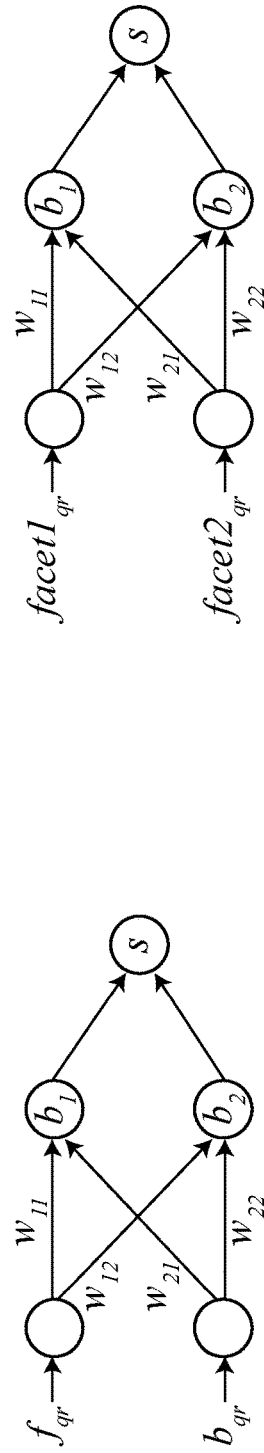
FIG. 14
FIG. 15A
FIG. 15B

METHOD AND SYSTEM FOR FACILITATING IDENTIFICATION OF AN OBJECT-OF-INTEREST

RELATED APPLICATIONS

This application claims the benefit of U.S. Provisional Patent Application No. 62/578,237, filed on Oct. 27, 2017, and U.S. Provisional Patent Application No. 62/655,702, filed on Apr. 10, 2018, which are hereby incorporated by reference in their entireties.

TECHNICAL FIELD

The present disclosure is directed at methods, systems and techniques for facilitating identification of an object-of-interest, in particular a person-of-interest.

BACKGROUND

In certain contexts, intelligent processing and playback of recorded video is an important function to have in a physical surveillance system. For example, a physical surveillance system may include many cameras, each of which records video. The total amount of video recorded by those cameras, much of which is typically recorded concurrently, makes relying upon manual location and tracking of a person-of-interest who appears in the recorded video inefficient. Intelligent processing and playback of video, and in particular automated search functionality, may accordingly be used to increase the efficiency with which a person-of-interest can be identified using a physical surveillance system.

Identifying a person-of-interest from among many potential persons-of-interest generally requires the surveillance system to rapidly categorize, compare and rank objects identified in a video feed, relative to a given person-of-interest. Typically, when comparing a person-of-interest to a potential person-of-interest, similarities between the persons' faces and bodies are established. The greater the similarities, the more likely it is that the images are of the same person-of-interest. Prior art methods typically rank search results according to the identified similarities. For example, potential persons-of-interest may be ranked according to how similar their faces are to that of the person-of-interest, or according to how similar their bodies are to that of the person-of-interest.

There nonetheless remains a need in the art for methods that more accurately rank search results so that a person-of-interest may be identified more rapidly from among many potential persons-of-interest.

SUMMARY

In a first aspect of the disclosure, there is provided a method of facilitating identification of a person-of-interest. The method comprises, for each of multiple gallery images: determining a face similarity score of a query image relative to the gallery image, wherein the query image comprises at least a portion of a person-of-interest, and wherein the gallery image comprises at least a portion of a potential person-of-interest; determining a body similarity score of the query image relative to the gallery image; and determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest. The method further comprises ranking the gallery images according to each fused similarity score of the respective gallery images. The method further comprises transmitting the gallery images for display according to the ranking. More generally, the method may further comprise outputting an indication of the ranking.

The method may further comprise determining the relationship. Determining the relationship may comprise: determining reference face similarity scores and reference body similarity scores for pairs of multiple reference images, wherein each reference image comprises at least a portion of a reference person-of-interest; determining, based on the reference face similarity scores and the reference body similarity scores, reference fused similarity scores by constraining the reference fused similarity scores as a function of whether or not the pairs of the reference images comprise at least portions of the same reference persons-of-interest; and determining the relationship based on the reference face similarity scores, the reference body similarity scores and the reference fused similarity scores. One or more of the determining the reference face similarity scores and the reference body similarity scores, the determining the reference fused similarity scores, and the determining the relationship, may be performed by a machine learning module configured to implement a machine learning process. The machine learning module may be configured to implement a neural network to which are input the multiple reference images. The neural network may be a multi-layer, soft-max neural network.

Determining one or more of the face similarity score and the body similarity score may comprise: using a convolutional neural network to determine one or more similarity signatures between the query image and the gallery image; and determining one or more separations between the one or more similarity signatures, wherein one or more of the face similarity score and the body similarity score are a function of the one or more separations. The separations may comprise distances.

The at least a portion of the person-of-interest may comprise at least a portion of: a body of the person-of-interest; a torso of the person-of-interest; a face of the person-of-interest; and a body and a face of the person-of-interest. A body comprises at least as much as a torso, and possibly more.

The at least a portion of the potential person-of-interest may comprise at least a portion of: a body of the potential person-of-interest; a torso of the potential person-of-interest; a face of the potential person-of-interest; and a body and a face of the potential person-of-interest.

Determining the face similarity score may comprise: determining whether either a face of the person-of-interest is absent from the query image or a face of the potential person-of-interest is absent from the gallery image; and if so, determining the face similarity score to be a default face similarity score. The default face similarity score may comprise a median of face similarity scores determined for the query image relative to other ones of the multiple gallery images. Determining the body similarity score may comprise: determining whether either a body of the person-of-interest is absent from the query image or a body of the potential person-of-interest is absent from the gallery image; and if so, determining the body similarity score to be a default body similarity score. The default face similarity score may comprise a median of body similarity scores determined for the query image relative to other ones of the multiple gallery images.

Prior to determining the fused similarity score, the method may further comprise adjusting at least one of the face similarity score and the body similarity score based on an image quality metric of one or more of the query image and the gallery image. The image quality metric may comprise an image resolution.

Prior to determining the fused similarity score, the method may further comprise adjusting at least one of the face similarity score and the body similarity score based on time data associated with one or more of the query image and the gallery image. The time data may be indicative of when one or more of the query image and the gallery image were taken. The method may further comprise: determining whether the time data meets a criterion; and if not, determining one or more of the face similarity score and the body similarity score to be one or more of a default face similarity score and a default body similarity score.

The query image may be part of a set of multiple query images, and the method may further comprise, prior to determining the fused similarity score, adjusting one or more of the face similarity score and the body similarity score based on: a similarity of the query image relative to: a second query image of the multiple query images; or a second one of the multiple gallery images; and a similarity of the second query image or the second gallery image relative to: a third query image of the multiple query images; or a third one of the multiple gallery images. The similarity may comprise one or more of a face similarity score and a body similarity score.

In a further aspect of the disclosure, there is provided a system for facilitating identification of a person-of-interest. The system comprises a display; a processor; and a memory communicatively coupled to the processor and having stored thereon computer program code executable by the processor. The computer program code is configured, when executed by the processor, to cause the processor to perform a method comprising: for each of multiple gallery images: determining a face similarity score of a query image relative to the gallery image, wherein the query image comprises at least a portion of a person-of-interest, and wherein the gallery image comprises at least a portion of a potential person-of-interest; determining a body similarity score of the query image relative to the gallery image; determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest. The method further comprises: ranking the gallery images according to each fused similarity score of the respective gallery images; and transmitting the gallery images for display on the display according to the ranking. More generally, the method may further comprise outputting an indication of the ranking.

The system may further comprise one or more video cameras communicatively coupled to the processor. The processor may be configured to receive from the one or more video cameras the query image and the multiple gallery images.

In a further aspect of the disclosure, there is provided a system for facilitating identification of a person-of-interest. The system comprises a client device comprising a display; one or more video cameras for recording a query image and multiple gallery images, wherein the query image comprises at least a portion of a person-of-interest, and wherein the gallery image comprises at least a portion of a potential person-of-interest; and a server communicatively coupled to the client device and the one or more video cameras. The server comprises a processor; and a memory communicatively coupled to the processor and having stored thereon computer program code executable by the processor. The computer program code is configured, when executed by the processor, to cause the processor to perform a search method. The server is configured to: receive from the client device a request to facilitate identification of the person-of-interest; and in response thereto, cause the processor to execute the computer program code so as to perform the search method. The search method comprises: for each of the multiple gallery images: determining a face similarity score of the query image relative to the gallery image; determining a body similarity score of the query image relative to the gallery image; determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest. The search method further comprises: ranking the gallery images according to each fused similarity score of the respective gallery images; and transmitting the gallery images to the client device for display on the display according to the ranking. More generally, the search method may further comprise outputting an indication of the ranking.

In a further aspect of the disclosure, there is provided a computer-readable medium having stored thereon computer program code executable by a processor. The computer program code is configured, when executed by the processor, to cause the processor to perform a method comprising: for each of multiple gallery images: determining a face similarity score of a query image relative to the gallery image, wherein the query image comprises at least a portion of a person-of-interest, and wherein the gallery image comprises at least a portion of a potential person-of-interest; determining a body similarity score of the query image relative to the gallery image; determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest. The method further comprises: ranking the gallery images according to their respective fused similarity scores; and transmitting the gallery images for display on the display according to the ranking. More generally, the method may further comprise outputting an indication of the ranking.

In a further aspect of the disclosure, there is provided a method of facilitating identification of a person-of-interest. The method comprises obtaining a set of query images and a set of gallery images, the set of query images comprising one or more query images, the set of gallery images comprising multiple gallery images, each query image comprising at least a portion of a person-of-interest, and each gallery image comprising at least a portion of a potential person-of-interest; determining face similarity scores of the one or more query images relative to the gallery images, and at least one face similarity score of at least one of the gallery images relative to at least one other of the gallery images; determining body similarity scores of the one or more query images relative to the gallery images, and at least one body similarity score of at least one of the gallery images relative to at least one other of the gallery images; generating a data structure comprising nodes and one or more links connecting one or more of the nodes, wherein each node is associated with at least one of the one or more query images and the gallery images, and wherein one or more pairs of the nodes are connected by one or more links based on at least one of: one or more of the face similarity scores of the images associated with the one or more node pairs; and one or more of the body similarity scores of the images associated with the one or more node pairs; using one or more graph partitioning algorithms or methods with the data structure so as to cluster the nodes based on the one or more links; and transmitting the images associated with at least one of the clustered nodes for display. The at least one of the clustered nodes may comprise at least one of the one or more query images. More generally, the method may further comprise outputting an indication of the ranking.

A face similarity score may be indicative of whether or not a person-of-interest and a potential person-of-interest are the same person-of-interest.

A body similarity score may be indicative of whether or not a person-of-interest and a potential person-of-interest are the same person-of-interest.

The one or more graph partitioning algorithms or methods may comprise one or more of: a randomized graph partitioning algorithm or method; a heuristic graph partitioning algorithm or method; a clustering method; and a Chinese Whispers randomized graph partitioning algorithm or method.

The method may further comprise determining fused similarity scores of the one or more query images relative to the gallery images by applying a relationship between the face similarity scores, the body similarity scores, and the fused similarity scores, wherein a fused similarity score is indicative of whether or not a person-of-interest and a potential person-of-interest are the same person-of-interest. The one or more node pairs may be further connected by the one or more links based on one or more of the fused similarity scores of the images associated with the one or more node pairs. The relationship may be determined. Determining the relationship may comprise determining reference face similarity scores and reference body similarity scores for pairs of multiple reference images, wherein each reference image comprises at least a portion of a reference person-of-interest; determining, based on the reference face similarity scores and the reference body similarity scores, reference fused similarity scores by constraining the reference fused similarity scores as a function of whether or not the pairs of the reference images comprise at least portions of the same reference persons-of-interest; and determining the relationship based on the reference face similarity scores, the reference body similarity scores and the reference fused similarity scores. One or more of the determining the reference face similarity scores and the reference body similarity scores, the determining the reference fused similarity scores, and the determining the relationship, may be performed by a machine learning module configured to implement a machine learning process.

In a further aspect of the disclosure, there is provided a method of facilitating identification of an object-of-interest. The method comprises, for each of multiple gallery images: determining a first set of facet similarity scores of a query image relative to the gallery image, wherein the query image comprises at least a portion of an object-of-interest, and wherein the gallery image comprises at least a portion of a potential object-of-interest; determining a second set of facet similarity scores of the query image relative to the gallery image; and determining a set of fused similarity scores of the query image relative to the gallery image by applying a set of relationships between the first set of facet similarity scores, the second set of facet similarity scores, and the set of fused similarity scores, wherein the set of fused similarity scores is indicative of whether or not the object-of-interest and the potential object-of-interest are the same object-of-interest. The method further comprises ranking the gallery images according to each set of fused similarity scores; and outputting an indication of the ranking. For example, the ranked gallery images may be transmitted for display.

The method may further comprise determining the set of relationships. Determining the set of relationships may comprise: determining first reference facet similarity scores and second reference facet similarity scores for pairs of multiple reference images, wherein each reference image comprises at least a portion of a reference object-of-interest; determining, based on the first reference facet similarity scores and the second reference facet similarity scores, reference fused similarity scores by constraining the reference fused similarity scores as a function of whether or not the pairs of the reference images comprise at least portions of the same reference object-of-interest; and determining the set of relationships based on the first reference facet similarity scores, the second reference facet similarity scores, and the reference fused similarity scores. One or more of the determining the first reference facet similarity scores and the second reference facet similarity scores, the determining the reference fused similarity scores, and the determining the set of relationships, may be performed by a machine learning module configured to implement a machine learning process. The machine learning module may be configured to implement a neural network to which are input the multiple reference images. The neural network may be a multi-layer, soft-max neural network.

Determining one or more of the first set of facet similarity scores and the second set of facet similarity scores may comprise: using a convolutional neural network to determine one or more similarity signatures between the query image and the gallery image; and determining one or more separations between the one or more similarity signatures, wherein one or more of the first set of facet similarity scores and the second set of facet similarity scores are a function of the one or more separations.

The determining of the first and second reference facet similarity scores may be performed by a set of machine learning modules configured to implement a set of machine learning processes, each machine learning process being used to determine a respective one of the reference facet similarity scores.

The object-of-interest may comprise a person-of-interest, and the at least a portion of the object-of-interest or the at least a portion of the potential object-of-interest may comprise at least a portion of: a head; hair; a foot; a lower leg; an upper leg; a lower arm; an upper arm; a chest; a lower abdomen; an upper abdomen; an upper portion of a face; a lower portion of a face; a neck; a hand; and a pelvis.

A facet similarity score may be indicative of whether or not the person-of-interest and the potential person-of-interest are the same person-of-interest based on a common facet of the person-of-interest and the potential person-of-interest, such as, but not limited to, that person's gender, that person's age, a type of clothing being worn by that person, a color of that clothing, a pattern displayed on that clothing, that person's hair color, that person's hair length, that person's footwear color, and that person's clothing accessories (such as, for example, a purse or bag).

Prior to determining the set of fused similarity scores, the method may further comprise adjusting at least one of the first set of facet similarity scores and the second set of facet similarity scores based on an image quality metric of one or more of the query image and the gallery image. The image quality metric may comprise an image resolution.

Prior to determining the set of fused similarity scores, the method may further comprise adjusting at least one of the first set of facet similarity scores and the second set of facet similarity scores based on time data associated with one or more of the query image and the gallery image. The time data may be indicative of when one or more of the query image and the gallery image were captured. The method may further comprise: determining whether the time data meets a criterion; and if not, determining one or more of the first set of facet similarity scores and the set of facet similarity scores to be one or more of a default first set of facet similarity scores and a default second set of facet similarity scores.

The query image may be part of a set of multiple query images, and the method may further comprise, prior to determining the set of fused similarity scores, adjusting one or more of the first set of facet similarity scores and the second set of facet similarity scores based on: a similarity of the query image relative to: a second query image of the multiple query images; or a second one of the multiple gallery images; and a similarity of the second query image or the second gallery image relative to: a third query image of the multiple query images; or a third one of the multiple gallery images. The similarity may be based on sets of facet similarity scores.

The ranking may comprise: in each set of fused similarity scores, summing at least two of the fused similarity scores; and ranking the gallery images according to the summed fused similarity scores.

The method may further comprise adjusting at least one of the first set of facet similarity scores, the second set of facet similarity scores, and the set of fused similarity scores based on the at least a portion of the object-of-interest or the at least a portion of the potential object-of-interest.

The method may further comprise adjusting at least one of the first set of facet similarity scores, the second set of facet similarity scores, and the set of fused similarity scores based on a position of a first camera used to capture the gallery image relative to a position of a second camera used to capture the query image. The adjusting may be further based on a direction in which the at least a portion of the object-of-interest or the at least a portion of the potential object-of-interest exits a field of view of the first camera or the second camera.

In a further aspect of the disclosure, there is provided a system for facilitating identification of an object-of-interest, comprising: a display; a processor; and a memory communicatively coupled to the processor and having stored thereon computer program code executable by the processor and configured, when executed by the processor, to cause the processor to perform a method. The method comprises, for each of multiple gallery images: determining a first set of facet similarity scores of a query image relative to the gallery image, wherein the query image comprises at least a portion of an object-of-interest, and wherein the gallery image comprises at least a portion of a potential object-of-interest; determining a second set of facet similarity scores of the query image relative to the gallery image; and determining a set of fused similarity scores of the query image relative to the gallery image by applying a set of relationships between the first set of facet similarity scores, the second set of facet similarity scores, and the set of fused similarity scores, wherein the set of fused similarity scores is indicative of whether or not the object-of-interest and the potential object-of-interest are the same object-of-interest. The method further comprises ranking the gallery images according to each set of fused similarity scores; and outputting an indication of the ranking. For example, the ranked gallery images may be transmitted for display.

Any feature described above in connection with the method of facilitating identification of an object-of-interest may be combined with the above-described system for facilitating identification of an object-of-interest.

In a further aspect of the disclosure, there is provided a computer-readable medium having stored thereon computer program code executable by a processor and configured, when executed by the processor, to cause the processor to perform a method. The method comprises, for each of multiple gallery images: determining a first set of facet similarity scores of a query image relative to the gallery image, wherein the query image comprises at least a portion of an object-of-interest, and wherein the gallery image comprises at least a portion of a potential object-of-interest; determining a second set of facet similarity scores of the query image relative to the gallery image; and determining a set of fused similarity scores of the query image relative to the gallery image by applying a set of relationships between the first set of facet similarity scores, the second set of facet similarity scores, and the set of fused similarity scores, wherein the set of fused similarity scores is indicative of whether or not the object-of-interest and the potential object-of-interest are the same object-of-interest. The method further comprises ranking the gallery images according to each set of fused similarity scores; and outputting an indication of the ranking. For example, the ranked gallery images may be transmitted for display.

Any feature described above in connection with the system of facilitating identification of an object-of-interest may be combined with the immediately above-described computer-readable medium.

In a further aspect of the disclosure, there is provided a system for facilitating identification of an object-of-interest. The system comprises a client device comprising a display; one or more video cameras for recording a query image and multiple gallery images, wherein the query image comprises at least a portion of a person-of-interest, and wherein the gallery image comprises at least a portion of a potential person-of-interest; and a server communicatively coupled to the client device and the one or more video cameras, wherein the server comprises: a processor; and a memory communicatively coupled to the processor and having stored thereon computer program code executable by the processor and configured, when executed by the processor, to cause the processor to perform a search method. The server is configured to: receive from the client device a request to facilitate identification of the person-of-interest; and in response thereto, cause the processor to execute the computer program code so as to perform the search method. The search method comprises, for each of the multiple gallery images: determining a first set of facet similarity scores of the query image relative to the gallery image; determining a second set of facet similarity scores of the query image relative to the gallery image; and determining a set of fused similarity scores of the query image relative to the gallery image by applying a set of relationships between the first set of facet similarity scores, the second set of facet similarity scores, and the set of fused similarity scores, wherein the set of fused similarity scores is indicative of whether or not the object-of-interest and the potential object-of-interest are the same object-of-interest. The search method further comprises ranking the gallery images according to each set of fused similarity scores; and outputting an indication of the ranking. For example, the ranked gallery images may be transmitted for display.

In a further aspect of the disclosure, there is provided a method of facilitating identification of an object-of-interest, comprising: obtaining a set of query images and a set of gallery images, the set of query images comprising one or more query images, the set of gallery images comprising multiple gallery images, each query image comprising at least a portion of an object-of-interest, and each gallery image comprising at least a portion of a potential object-of-interest; determining first sets of facet similarity scores of the one or more query images relative to the gallery images, and at least one first set of facet similarity scores of at least one of the gallery images relative to at least one other of the gallery images; determining second sets of facet similarity scores of the one or more query images relative to the gallery images, and at least one second set of facet similarity scores of at least one of the gallery images relative to at least one other of the gallery images; generating a data structure comprising nodes and one or more links connecting one or more of the nodes, wherein each node is associated with at least one of the one or more query images and the gallery images, and wherein one or more pairs of the nodes are connected by one or more links based on at least one of: one or more of the first sets of facet similarity scores of the images associated with the one or more node pairs; and one or more of the second sets of facet similarity scores of the images associated with the one or more node pairs; using one or more graph partitioning methods with the data structure so as to cluster the nodes based on the one or more links; and outputting an indication of the images associated with at least one of the clustered nodes. For example, the ranked gallery images may be transmitted for display.

A first/second facet similarity score may be indicative of whether or not an object-of-interest and a potential object-of-interest are the same object-of-interest.

The one or more graph partitioning methods comprise one or more of: a randomized graph partitioning method; a heuristic graph partitioning method; a clustering method; and a Chinese Whispers randomized graph partitioning method.

The method may further comprise determining sets of fused similarity scores of the one or more query images relative to the gallery images by applying sets of relationships between the first sets of facet similarity scores, the second sets of facet similarity scores, and the sets of fused similarity scores, wherein a set of fused similarity scores is indicative of whether or not an object-of-interest and a potential object-of-interest are the same object-of-interest, wherein the one or more node pairs are further connected by the one or more links based on the sets of fused similarity scores of the images associated with the one or more node pairs. The method may further comprise determining the sets of relationships. The method may further comprise determining first sets of reference facet similarity scores and second sets of reference facet similarity scores for pairs of multiple reference images, wherein each reference image comprises at least a portion of a reference object-of-interest; determining, based on the first sets of reference facet similarity scores and the second sets of reference facet similarity scores, sets of reference fused similarity scores by constraining the reference fused similarity scores as a function of whether or not the pairs of the reference images comprise at least portions of the same reference object-of-interest; and determining the sets of relationships based on the first sets reference facet similarity scores, the second sets of reference facet similarity scores, and the sets of reference fused similarity scores. One or more of the determining the first sets of reference facet similarity scores and the second sets of reference facet similarity scores, the determining the sets of reference fused similarity scores, and the determining the sets of relationships, may be performed by a machine learning module configured to implement a machine learning process.

The object-of-interest may comprise a person-of-interest, and the at least a portion of the object-of-interest or the at least a portion of the potential object-of-interest may comprise at least a portion of: a head; hair; a foot; a lower leg; an upper leg; a lower arm; an upper arm; a chest; a lower abdomen; an upper abdomen; an upper portion of a face; a lower portion of a face; a neck; a hand; and a pelvis.

The method may be associated with a corresponding system and a corresponding computer-readable medium.

In a further aspect of the disclosure, there is provided a method of facilitating identification of an object-of-interest. The method comprises, for each of multiple gallery images: determining a first similarity score of a query image relative to the gallery image, wherein the first similarity score comprises a face similarity score or a body similarity score, wherein the query image comprises at least a portion of an object-of-interest, and wherein the gallery image comprises at least a portion of a potential object-of-interest; determining a set of facet similarity scores of the query image relative to the gallery image; and determining a set of fused similarity scores of the query image relative to the gallery image by applying a set of relationships between the first similarity score, the set of facet similarity scores, and the set of fused similarity scores, wherein the set of fused similarity scores is indicative of whether or not the object-of-interest and the potential object-of-interest are the same object-of-interest. The method further comprises ranking the gallery images according to each set of fused similarity scores; and outputting an indication of the ranking. For example, the ranked gallery images may be transmitted for display.

Any feature described above in connection with the (first) method of facilitating identification of an object-of-interest may be combined with the immediately above-described (second) method of facilitating identification of an object-of-interest.

The method may be associated with a corresponding system and a corresponding computer-readable medium.

BRIEF DESCRIPTION OF THE DRAWINGS

Reference will now be made, by way of example, to the accompanying drawings:

FIGS. 10A-10E depict a user interface page or portions thereof in various states while a facet search is being performed, according to another example embodiment.

FIGS. 11A-11E depict a user interface page or portions thereof in various states when a natural language facet search is being performed, according to another example embodiment.

FIGS. 12A, 12B, 13A, and 13B depict menus allowing a user to select various facets, according to additional example embodiments.

FIG. 14 shows a method of facilitating identification of a person-of-interest, by ranking face and body search results as a function of fused similarity scores, in accordance with an example embodiment of the disclosure.

FIGS. 15A and 15B show neural networks used to determine fused similarity scores, in accordance with example embodiments of the disclosure.

Similar or the same reference numerals may have been used in different figures to denote similar example features illustrated in the drawings.

DETAILED DESCRIPTION OF EXAMPLE EMBODIMENTS

Figure 1:
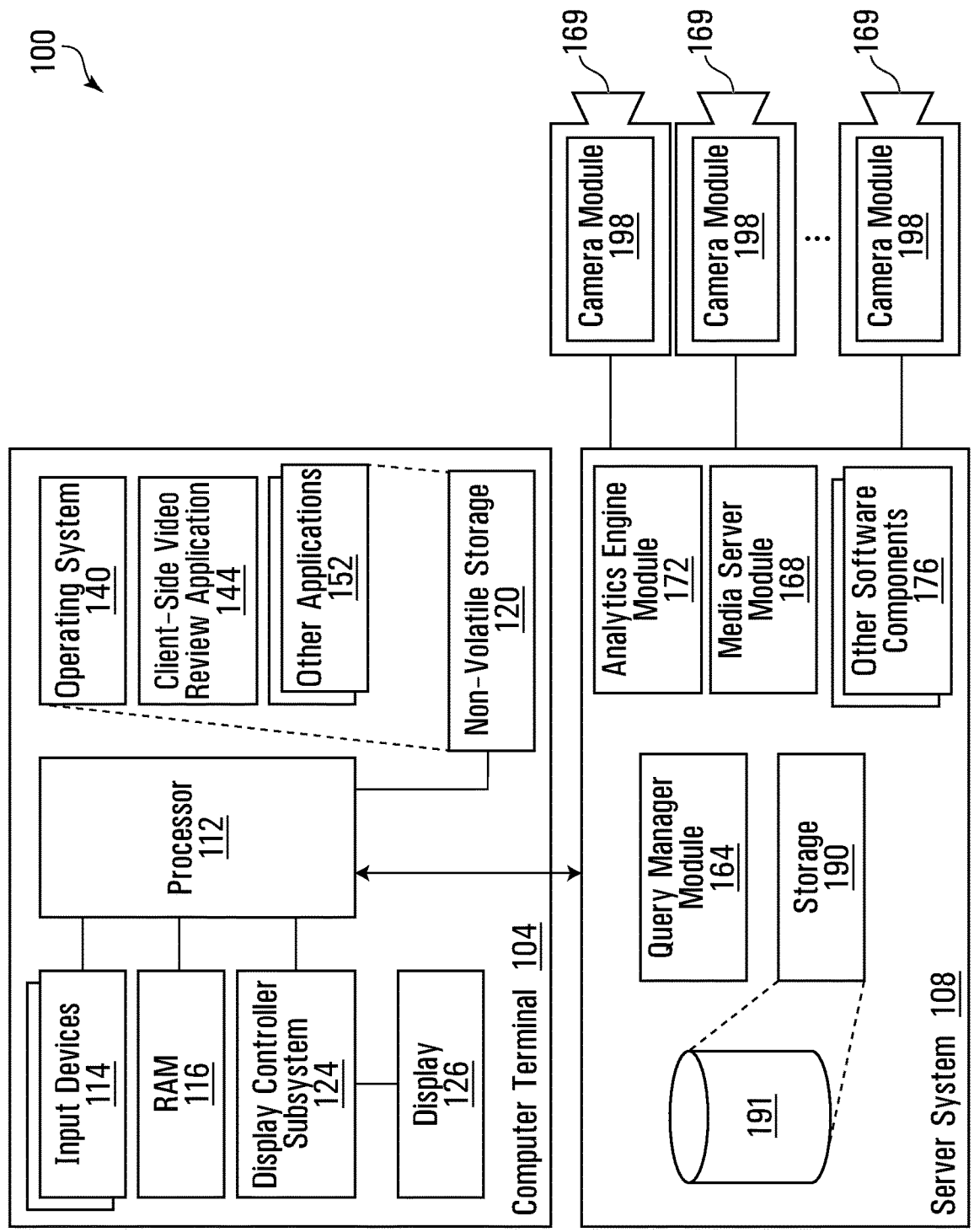
FIG. 1 shows a block diagram of an example physical surveillance system within which methods in accordance with example embodiments can be carried out.

The present disclosure seeks to provide methods and systems for facilitating identification of an object-of-interest.

While various embodiments of the disclosure are described below, the disclosure is not limited to these embodiments, and variations of these embodiments may well fall within the scope of the disclosure which is to be limited only by the appended claims.

It will be understood that when an element is herein referred to as being "connected", "in communication with" or "coupled" to another element, it can be directly connected, directly in communication with or directly coupled to the other element or intervening elements may be present. In contrast, when an element is herein referred to as being "directly connected", "directly in communication with" or "directly coupled" to another element, there are no intervening elements present. Other words used to describe the relationship between elements should be interpreted in a like fashion (i.e., "between" versus "directly between", "adjacent" versus "directly adjacent", etc.).

As will be appreciated by one skilled in the art, the various example embodiments described herein may be embodied as a method, system, or computer program product. Accordingly, the various example embodiments may take the form of, for example, an entirely software embodiment (including firmware, resident software, micro-code, etc.) or, as another example, an embodiment combining software and hardware aspects that may all generally be referred to herein as a "module" or "system". Furthermore, the various example embodiments may take the form of a computer program product on a computer-usable storage medium having computer-usable program code embodied in the medium.

Any suitable computer-usable or computer readable medium may be used. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++ or the like. However, the computer program code for carrying out operations of various example embodiments may also be written in conventional procedural programming languages, such as the "C" programming language or similar programming languages. The actual programming language selected is a matter of design choice and, as will be appreciated by those skilled in the art, any suitable programming language can be utilized.

Various example embodiments are described below with reference to flowchart illustration(s) and/or block diagrams of methods, apparatus (systems) and computer program products according to various embodiments. Those skilled in the art will understand that various blocks of the flowchart illustration(s) and/or block diagrams, and combinations of blocks in the flowchart illustration(s) and/or block diagrams, can be implemented by computer program instructions. These computer program instructions may be provided to a processor of a general purpose computer, special purpose computer, or other programmable data processing apparatus to produce a machine, such that the instructions, which executed via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

This disclosure describes various example embodiments. It is contemplated that any part of any example embodiment described herein may be implemented or combined with any part of any other example embodiment described herein.

Reference is now made to FIG. 1 which shows a block diagram of an example surveillance system 100 within which methods in accordance with example embodiments can be carried out. Included within the illustrated surveillance system 100 are one or more computer terminals 104 and a server system 108. In some example embodiments, the computer terminal 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. As will be appreciated by those skilled in the art, at least some of the functionality of the server system 108 can be implemented within the computer terminal 104 rather than within the server system 108.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal 104. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems (not shown). The display controller subsystem 124 interacts with display 126 and it renders graphics and/or text upon the display 126.

Still with reference to the computer terminal 104 of the surveillance system 100, operating system 140 and various software applications used by the processor 112 are stored in the non-volatile storage 120. The non-volatile storage 120 is, for example, one or more hard disks, solid state drives, or some other suitable form of computer-readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, client-side video review application 144, and other applications 152, or parts thereof, may be temporarily loaded into a volatile store such as the RAM 116. The processor 112, in addition to its operating system functions, can enable execution of the various software applications on the computer terminal 104.

Figure 2:
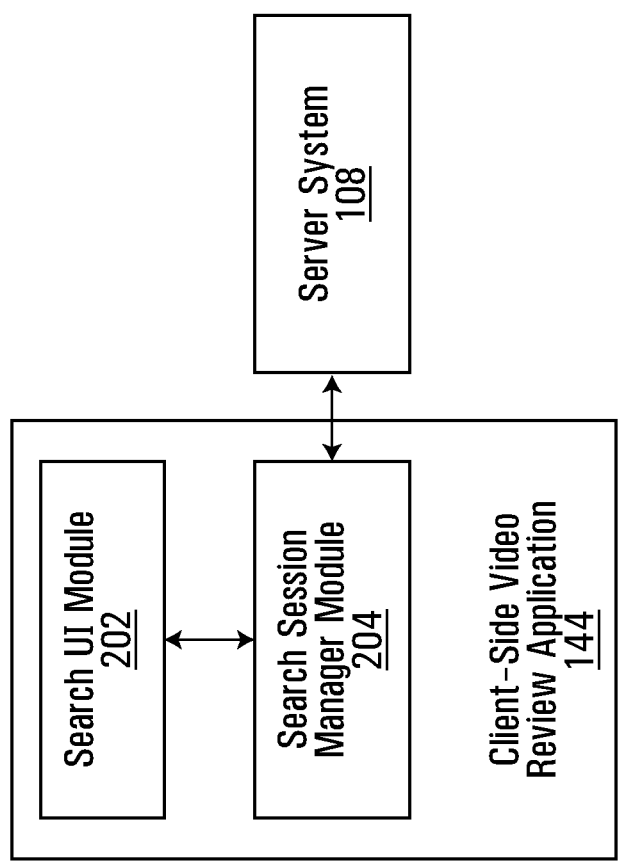
FIG. 2 shows a block diagram of a client-side video review application, in accordance with certain example embodiments, that can be provided within the example surveillance system of FIG. 1.

More details of the video review application 144 are shown in the block diagram of FIG. 2. The video review application 144 can be run on the computer terminal 104 and includes a search User Interface (UI) module 202 for cooperation with a search session manager module 204 in order to enable a computer terminal user to carry out actions related to providing input and, more specifically, input to facilitate identifying same individuals or objects appearing in a plurality of different video recordings. In such circumstances, the user of the computer terminal 104 is provided with a user interface generated on the display 126 through which the user inputs and receives information in relation the video recordings.

The video review application 144 also includes the search session manager module 204 mentioned above. The search session manager module 204 provides a communications interface between the search UI module 202 and a query manager module 164 (FIG. 1) of the server system 108. In at least some examples, the search session manager module 204 communicates with the query manager module 164 through the use of Remote Procedure Calls (RPCs).

Besides the query manager module 164, the server system 108 includes several software components for carrying out other functions of the server system 108. For example, the server system 108 includes a media server module 168. The media server module 168 handles client requests related to storage and retrieval of video taken by video cameras 169 in the surveillance system 100. The server system 108 also includes an analytics engine module 172. The analytics engine module 172 can, in some examples, be any suitable one of known commercially available software that carry out mathematical calculations (and other operations) to attempt computerized matching of same individuals or objects as between different portions of video recordings (or as between any reference image and video compared to the reference image). For example, the analytics engine module 172 can, in one specific example, be a software component of the Avigilon Control Center™ server software sold by Avigilon Corporation. In some examples the analytics engine module 172 can use the descriptive characteristics of the person's or object's appearance. Examples of these characteristics include the person's or object's shape, size, textures and color.

The server system 108 also includes a number of other software components 176. These other software components will vary depending on the requirements of the server system 108 within the overall system. As just one example, the other software components 176 might include special test and debugging software, or software to facilitate version updating of modules within the server system 108. The server system 108 also includes one or more data stores 190. In some examples, the data store 190 comprises one or more databases 191 which facilitate the organized storing of recorded video.

Regarding the video cameras 169, each of these includes a camera module 198. In some examples, the camera module 198 includes one or more specialized integrated circuit chips to facilitate processing and encoding of video before it is even received by the server system 108. For instance, the specialized integrated circuit chip may be a System-on-Chip (SoC) solution including both an encoder and a Central Processing Unit (CPU). These permit the camera module 198 to carry out the processing and encoding functions. Also, in some examples, part of the processing functions of the camera module 198 includes creating metadata for recorded video. For instance, metadata may be generated relating to one or more foreground areas that the camera module 198 has detected, and the metadata may define the location and reference coordinates of the foreground visual object within the image frame. For example, the location metadata may be further used to generate a bounding box, typically rectangular in shape, outlining the detected foreground visual object. The image within the bounding box may be extracted for inclusion in metadata. The extracted image may alternately be smaller than what was in the bounding box or may be larger than what was in the bounding box. The size of the image being extracted can also be close to, but outside of, the actual boundaries of a detected object.

In some examples, the camera module 198 includes a number of submodules for video analytics such as, for instance, an object detection submodule, an instantaneous object classification submodule, a temporal object classification submodule and an object tracking submodule. Regarding the object detection submodule, such a submodule can be provided for detecting objects appearing in the field of view of the camera 169. The object detection submodule may employ any of various object detection methods understood by those skilled in the art such as, for example, motion detection and/or blob detection.

Regarding the object tracking submodule that may form part of the camera module 198, this may be operatively coupled to both the object detection submodule and the temporal object classification submodule. The object tracking submodule may be included for the purpose of temporally associating instances of an object detected by the object detection submodule. The object tracking submodule may also generate metadata corresponding to visual objects it tracks.

Regarding the instantaneous object classification submodule that may form part of the camera module 198, this may be operatively coupled to the object detection submodule and employed to determine a visual objects type (such as, for example, human, vehicle or animal) based upon a single instance of the object. The input to the instantaneous object classification submodule may optionally be a sub-region of an image in which the visual object of interest is located rather than the entire image frame.

Regarding the temporal object classification submodule that may form part of the camera module 198, this may be operatively coupled to the instantaneous object classification submodule and employed to maintain class information of an object over a period of time. The temporal object classification submodule may average the instantaneous class information of an object provided by the instantaneous classification submodule over a period of time during the lifetime of the object. In other words, the temporal object classification submodule may determine a type of an object based on its appearance in multiple frames. For example, gait analysis of the way a person walks can be useful to classify a person, or analysis of the legs of a person can be useful to classify a cyclist. The temporal object classification submodule may combine information regarding the trajectory of an object (e.g. whether the trajectory is smooth or chaotic, whether the object is moving or motionless) and confidence of the classifications made by the instantaneous object classification submodule averaged over multiple frames. For example, determined classification confidence values may be adjusted based on the smoothness of trajectory of the object. The temporal object classification submodule may assign an object to an unknown class until the visual object is classified by the instantaneous object classification submodule subsequent to a sufficient number of times and a predetermined number of statistics having been gathered. In classifying an object, the temporal object classification submodule may also take into account how long the object has been in the field of view. The temporal object classification submodule may make a final determination about the class of an object based on the information described above. The temporal object classification submodule may also use a hysteresis approach for changing the class of an object. More specifically, a threshold may be set for transitioning the classification of an object from unknown to a definite class, and that threshold may be larger than a threshold for the opposite transition (for example, from a human to unknown). The temporal object classification submodule may aggregate the classifications made by the instantaneous object classification submodule.

In some examples, the camera module 198 is able to detect humans and extract images of humans with respective bounding boxes outlining the human objects for inclusion in metadata which along with the associated video may be transmitted to the server system 108. At the system 108, the media server module 168 can process extracted images and generate signatures (e.g. feature vectors) to represent objects. In computer vision, a feature descriptor is generally known as an algorithm that takes an image and outputs feature descriptions or feature vectors. Feature descriptors encode information, i.e. an image, into a series of numbers to act as a numerical "fingerprint" that can be used to differentiate one feature from another. Ideally this information is invariant under image transformation so that the features may be found again in another image of the same object. Examples of feature descriptor algorithms are SIFT (Scale-invariant feature transform), HOG (histogram of oriented gradients), and SURF (Speeded Up Robust Features).

In accordance with at least some examples, a feature vector is an n-dimensional vector of numerical features (numbers) that represent an image of an object processable by computers. By comparing the feature vector of a first image of one object with the feature vector of a second image, a computer implementable process may determine whether the first image and the second image are images of the same object.

Similarity calculation can be just an extension of the above. Specifically, by calculating the Euclidean distance between two feature vectors of two images captured by one or more of the cameras 169, a computer implementable process can determine a similarity score to indicate how similar the two images may be, as described in further detail below.

In accordance with at least some examples, storage of feature vectors within the surveillance system 100 is contemplated. For instance, feature vectors may are indexed and stored in the database 191 with respective video. The feature vectors may also be associated with reference coordinates to where extracted images of respective objects are located in respective video. Storing may include storing video with, for example, time stamps, camera identifications, metadata with the feature vectors and reference coordinates, etc.

Referring now to FIGS. 3 to 8B, there are shown various user interface pages that the search UI module 202 displays to a user of the client-side video review application 144, according to one example embodiment. The embodiment depicted in FIGS. 2 to 8B permits the application's 144 user to commence a search for a person-of-interest and to have a face thumbnail and a body thumbnail of the person-of-interest displayed to assist the user in identifying the person-of-interest while reviewing image search results. As used herein, a "person-of-interest" is a person that the application's 144 user is attempting to locate using the surveillance system 100; a "body thumbnail" of a person displays at least a portion of a torso of that person; and a "face thumbnail" of a person displays at least a portion of a face of that person. In the depicted example embodiments, the body thumbnail of a person displays that person's head and torso, while the face thumbnail of that person shows, as a proportion of the total area of the thumbnail, more of that person's face than is shown in the body thumbnail. The server system 108 in the embodiment of FIGS. 2 to 8B is able to search any one or more of a collection of video recordings using any one or more of the cameras 169 based on one or both of the person-of-interest's body and face; the collection of video recordings may or may not be generated concurrently by the cameras 169. Permitting the body and face to be used during searching accordingly may help both the server system 108 and the user identify the person-of-interest, particularly when the person-of-interest's body changes appearance in different recordings or at different times (e.g., resulting from the person-of-interest changing clothes).

Body/Face Search

Figure 3:
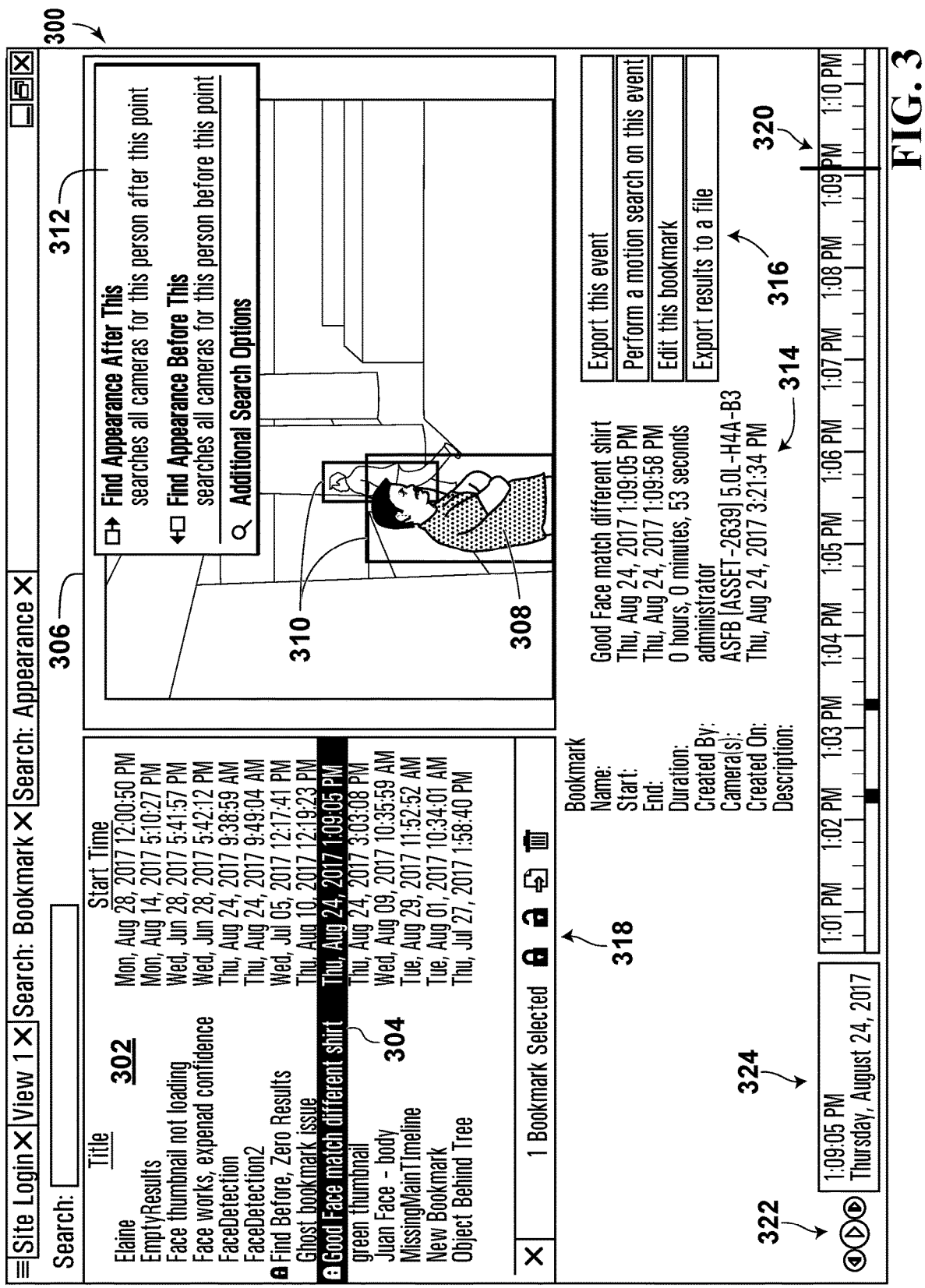
FIG. 3 shows a user interface page including an image frame of a video recording that permits a user to commence a search for a person-of-interest, according to an example embodiment implemented using the client-side video review application of FIG. 2.

Referring now to FIG. 3 in particular, there is shown a user interface page 300 including an image frame 306 of a selected video recording that permits a user of the application 144 to commence a search for a person-of-interest 308. The selected video recording shown in FIG. 3 is one of the collection of video recordings obtained using different cameras 169 to which the user has access via the application 144. The application 144 displays the page 300 on the terminal's 104 display 126. The user provides input to the application 144 via the input device 114, which in the example embodiment of FIG. 3 comprises a mouse or touch pad. In FIG. 3, displaying the image frame 306 comprises the application 144 displaying the image frame 306 as a still image, although in different embodiments displaying the image frame 306 may comprise playing the selected video recording or playing the selected video recording.

The image frame 306 of the selected video recording occupies the entirety of, and extends beyond, the top-right quadrant of the page 300. The frame 306 depicts a scene in which multiple persons are present. The server system 108 automatically identifies persons appearing in the scene that may be the subject of a search, and thus who are potential persons-of-interest 308 to the user, and highlights each of those persons by enclosing all or part of each in a boundary box 310. In FIG. 3, the user identifies the person located in the lowest boundary box 310 as the person-of-interest 308, and selects the boundary box 310 around that person to evoke a context menu 312 that may be used to commence a search. The context menu 312 presents the user with one option to search the collection of video recordings at all times after the image frame 306 for the person-of-interest 308, and another option to search the collection of video recordings at all times before the image frame 306. The user may select either of those options to have the server system 108 commence searching for the person-of-interest 308. The input the user provides to the server system 108 via the application 144 to commence a search for the person-of-interest is the "search commencement user input".

In FIG. 3, the user has bookmarked the image frame 306 according to which of the cameras 169 obtained it and its time index so as to permit the user to revisit that image frame 306 conveniently. Immediately below the image frame 306 is bookmark metadata 314 providing selected metadata for the selected video recording, such as its name and duration. To the right of the bookmark metadata 314 and below the image frame 306 are action buttons 316 that allow the user to perform certain actions on the selected video recording, such as to export the video recording and to perform a motion search on the recording.

Immediately to the left of the image frame 306 is a bookmark list 302 showing the user's bookmarks, with a selected bookmark 304 corresponding to the image frame 306. Immediately below the bookmark list 302 are bookmark options 318 permitting the user to perform actions such as to lock or unlock any one or more of the bookmarks to prevent them from being or to permit them to be changed, to export any one or more of the bookmarks, and to delete any one or more of the bookmarks.

Immediately below the bookmark options 318 and bordering a bottom-left edge of the page 300 are video control buttons 322 permitting the user to play, pause, fast forward, and rewind the selected video recording. Immediately to the right of the video control buttons 322 is a video time indicator 324, displaying the date and time corresponding to the image frame 306. Extending along a majority of the bottom edge of the page 300 is a timeline 320 permitting the user to scrub through the selected video recording and through the video collectively represented by the collection of video recordings. As discussed in further detail below in respect of FIGS. 8A and 8B, the timeline 320 is resizable in a manner that is coordinated with other features on the page 300 to facilitate searching.

Now referring to FIG. 14, in response to a search commencement user input the user provides using the context menu 312 of FIG. 3, the server system 108 generates image search results 406 by searching the collection of video recordings for the person-of-interest 308. The search commencement user input triggers a method 1400 performed by server system 108 which is directed at ranking potential persons-of-interest as a function of their similarity to the person-of-interest 308. In particular, the method 1400 determines a probability that a query image and a gallery image comprise at least a portion of the same person-of-interest. The determined probability is a measure of a likelihood that the person-of-interest and the potential person-of-interest are the same person.

In the following description, an image, or image portion, of a person-of interest is referred to as a "query image", and an image, or image portion, of a potential person-of interest is referred to as a "gallery image". In some embodiments, and in particular in the body/face search described below, the query image comprises at least a portion of a body of the person-of-interest, and may additionally include at least a portion of a face of the person-of-interest. Images of the face and body may be taken from separate images, such that the query image may be a composite image which combines an image of the person's body and an image of the person's face. Similarly, the gallery image comprises at least a portion of a body of the potential person-of-interest, and may additionally include at least a portion of a face of the potential person-of-interest. Images of the face and body may be taken from separate images, such that the gallery image may be a composite image which combines an image of the person's body and an image of the person's face. In other embodiments, and in particular in the facet search described below, the query image and gallery image may comprise a more specific portion of a body of a person-of-interest. For example, the query image may comprise at least a portion of one or more of: a head; hair; a foot; a lower leg; an upper leg; a lower arm; an upper arm; a chest; a lower abdomen; an upper abdomen; an upper portion of a face; a lower portion of a face; a neck; a hand; and a pelvis. Additionally, the query image and/or the gallery image may comprise a composite image which combines multiple images of different facets of a person-of-interest.

Before proceeding with the method shown in FIG. 14, the server system 108 determines feature vectors of the query image and the gallery image. As described above, a feature vector is an n-dimensional vector of numerical features (numbers) that represent an image of an object that can be processed by computers. By comparing the feature vector of one image of one object with the feature vector of another image, a computer implementable process may determine whether the one image and the other image are images of the same object. The image signatures (or feature vectors, or embedding, or representation, etc.) are multi-dimensional vectors calculated by (for example convolutional) neural networks.

By calculating the Euclidean distance between the two feature vectors of the two images captured by the camera 108, a computer implementable process can determine a similarity score to indicate how similar the two images may be. The neural networks are trained in such manner that the feature vectors they compute for images are close (low Euclidian distance) for similar images and far (high Euclidian distance) for dissimilar images.

In this example implementation, the server system 108 uses a learning machine to process the query image and the gallery image to generate the feature vectors or signatures of the images of the persons-of-interest captured in the video. The learning machine is for example a neural network such as a convolutional neural network (CNN) running on a graphics processing unit (GPU) or vision processing unit (VPU). The CNN may be trained using training datasets containing millions of pairs of similar and dissimilar images. The CNN, for example, is a Siamese network architecture trained with a contrastive loss function to train the neural networks. An example of a Siamese network may be described in Bromley, Jane, et al. "Signature verification using a "Siamese" time delay neural network." International Journal of Pattern Recognition and Artificial Intelligence 7.04 (1993): 669-688.

Server system 108 deploys a trained model in what is known as batch learning where all of the training is done before it is used in the image search. The trained model, in this embodiment, is a convolutional neural network learning model with one possible set of parameters. There is an infinity of possible sets of parameters for a given learning model. Optimization methods (such as stochastic gradient descent), and numerical gradient computation methods (such as Backpropagation) were used to find the set of parameters that minimize our objective function (AKA loss function). Contrastive loss function is used as the objective function. This function is defined such that it takes high values when the current trained model is less accurate (assigns high distance to similar pairs, or low distance to dissimilar pairs), and low values when the current trained model is more accurate (assigns low distance to similar pairs, and high distance to dissimilar pairs). The training process is thus reduced to a minimization problem. The process of finding the most accurate model is the training process, the resulting model with the set of parameters is the trained model and the set of parameters is not changed once it is deployed for the image search.

In an alternate embodiment, a learning machine using what is known as online machine learning algorithms is deployed. The learning machine is deployed with an initial set of parameters; however the system updates the parameters of the model based on some source of truth (for example, user feedback in the selection of the images of the objects of interest). Such learning machines also include other neural networks as well as convolutional neural networks.

In greater detail, the trained model is trained with a pre-defined distance function used to compare the computed feature vectors. The same distance function is used when the trained model is deployed for the image search. The distance function is the Euclidian distance between the feature vectors where the feature vectors are normalized to have unit norms, and thus all feature vectors lie on a unit-norm hypersphere. After computing and storing the feature vectors of the detected objects in the database, searching similar objects is done using an exact nearest neighbor search: exhaustively evaluating the distance from the queried feature vector (feature vector of the query image) to all other vectors in the timeframe of interest.

In an alternate embodiment, an approximate nearest neighbor search may be used. It is similar to its 'exact' counterpart, but it retrieves the most likely similar results without looking at all results. This is faster, but may introduce false negatives. An example of approximate nearest neighbor may use an indexing of a hashing of the feature vectors. An approximate nearest neighbor search may be faster where the number of feature vectors is large such as when the search time frames are long.

With this background in mind, and returning to FIG. 14, at block 1410 the server system 108 determines a face similarity score of the query image relative to the gallery image. The term "relative" is used in the sense that the query image and gallery image are being compared to one another; however, the face similarity score (and body similarity score discussed below) is associated with both the query image and the gallery image. At block 1420, the server system 108 determines a body similarity score of the query image relative to the gallery image. The order of determining the face similarity score and the body similarity score is purely exemplary in nature. In other examples, the body similarity score may be determined before the face similarity score is determined, or the face and body similarity scores may be determined simultaneously.

As discussed above, in some examples, in order to determine the face similarity score and the body similarity score, the server system 108 uses one or more convolutional neural networks. Let the query image be defined by q, and the gallery image be defined by r. q and r are used as inputs to one or more convolutional neural networks. In particular, if the query image comprises both a body and a face of the person-of-interest, then a portion of the query image comprising the body is fed into a body convolutional network, and a portion of the query image comprising the face is fed into a face convolutional network. Similarly, if the gallery image comprises both a body and a face of the potential person-of-interest, then a portion of the gallery image comprising the body is fed into the body convolutional network, and a portion of the gallery image comprising the face is fed into the face convolutional network. The face similarity score, $f_{qr}$, and the body similarity score, $b_{qr}$, are then obtained by normalization of the Euclidean distance separating the feature vector of the face portion of the query image and the face portion of the gallery image, and the Euclidean distance separating the feature vector of the body portion of the query image and the body portion of the gallery image, respectively. In particular, $$f_{qr}, b_{qr} = 1 - \frac{\sqrt{\|X - Y\|^2}}{2}$$

wherein X is the feature vector of the query image and Y is the feature vector of the gallery image.

In one alternative embodiment, in order to determine the face similarity score, the coordinates of a boundary box that bounds the face of the query/gallery image (e.g., in terms of an (x,y) coordinate identifying one corner of the box and width or height of the box) and an estimation of the head pose (e.g., in terms of yaw, pitch, and roll) are generated. A feature vector may be generated that characterizes the faces using any one or more metrics. For example, for each face, any one or more of distance between the corners of eyes, distance between the centers of eyes, nose width, depth of eye sockets, shape of cheekbones, shape of jaw line, shape of chin, hair color, and the presence and color of facial hair may be used as metrics. Once the feature vectors are generated for the faces, the Euclidean distance between vectors for the faces may be determined and used to assess face similarity.

In at least one example embodiment, the cameras 169 generate the metadata and associated feature vectors in or nearly in real-time, and the server system 108 subsequently assesses face/body similarity using those feature vectors. However, in at least one alternative example embodiment the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess face similarity.

At block 1430, the server system 108 determines a relationship between the face similarity score, the body similarity score, and a fused similarity score. The fused similarity scores is a function of the face similarity score and the body similarity score, and is indicative of whether or not the person-of-interest (in the query image) is the same person as the potential person-of-interest (in the gallery image). Similarly to the determination of the face and body similarity scores, a neural network ("fused neural network") is trained and deployed for determination of the fused similarity score.

In order to train the fused neural network, many reference images of persons-of-interest are used as an input to the neural network. The fused neural network determines reference face similarity scores and reference body similarity scores for pairs of the reference images. Based on the reference face similarity scores and the reference body similarity scores, the fused neural network determines reference fused similarity scores by constraining the reference fused similarity scores as a function of whether or not the pairs of the reference images comprise at least portions of the same reference persons-of-interest.

In particular, the fused neural network is trained using the following constraint:

$$s = F(f_{qr}, b_{qr}) = \begin{cases} 1, & q = r \\ 0, & q \neq r \end{cases}$$

wherein s is the reference fused similarity score, $f_{qr}$ is the reference face similarity score, $b_{qr}$ is the reference body similarity score, F is the fusion function represented by the neural network, q is the query image, and r is the gallery image being compared to q. The fusion function F is effectively the relationship between the face similarity score, the body similarity score, and the fused similarity score s. In one example, a three-layer neural network is used, with non-linear elements for training. In another example, a no-hidden layer neural network is used, with only linear elements for training. It was found that the performance of the no-hidden layer neural network is similar to that of the three-layer neural network.

In one particular, example, a multi-layer soft-max neural network is used. An example of such a neural network is shown in FIG. 15A, wherein:

$$\begin{bmatrix} a_1 \\ a_2 \end{bmatrix} = \begin{bmatrix} w_{11} & w_{12} \\ w_{21} & w_{22} \end{bmatrix} \cdot \begin{bmatrix} f_{qr} \\ b_{qr} \end{bmatrix} + \begin{bmatrix} b_1 \\ b_2 \end{bmatrix}$$

$$s = \frac{1}{1 + \exp(a_1 - a_2)}$$

The "w" matrix comprises weights w of the neural network, the "b" matrix comprises biases b of the neural network, the "a" matrix comprises intermediate results a of the neural network, and s is the fused similarity score.

Training of the fused neural network preferably takes place before the face and body similarity scores are determined. For example, training of the fused neural network may take place simultaneously as training of the convolutional neural networks discussed above in connection with determining the face and body similarity scores.

In some examples, the relationship between the face similarity score, the body similarity score, and the fused similarity score may be determined by one or more computer devices external to the server system 108, and the relationship may be provided to the server system 108 by the one or more external computer devices. For example, the one or more external computer devices may train the fused neural network. In other examples, the server system 108 itself determines the relationship, by training the fused neural network using the data set of reference images. The data set may comprise any number of reference images, each reference image comprising at least a portion of a reference person-of-interest. The data set used to train the fused neural network may be the same data set as that used to train the convolutional neural networks, or may be a different data set.

At block 1440, having determined the relationship between s, $f_{qr}$, and $b_{qr}$, the server system 108 determines the fused similarity score of the query image relative to the gallery image. In particular, the server system 108 determines the fused similarity score by applying the relationship to the face similarity score and the body similarity score determined at blocks 1410 and 1420.

At block 1450, the server system 108 repeats blocks 1410, 1420 and 1440 for each other gallery image identified in the recorded video (or portion of recorded video which the user wishes to have analyzed), thereby obtaining a fused similarity score for each gallery image identified in the recorded video/portion of recorded video. At block 1460, the server system 108 ranks the gallery images according to their respective fused similarity scores, and at block 1470 instructs display of the ranked gallery images on the display 126 of the computer terminal 104. The ranked gallery images correspond to the image search results 406 in FIG. 4.

In some cases, the query image or the gallery image will not contain any portion of a person's face, or any portion of a person's body. If no face is present in either the query image or the gallery image, then a default face similarity score ($d_f$) is assigned as the face similarity score. In one example, the default face similarity score comprises a median of face similarity scores determined for the query image relative to other gallery images. If no body is present in either the query image or the gallery image, then a default body similarity score ($d_b$) is assigned as the body similarity score. In one example, the default body similarity score comprises a median of body similarity scores determined for the query image relative to other gallery images.

The following table illustrates the ranking of the gallery images according to their fused similarity scores and according to whether a face and/or body is present in the query/gallery image:

| | | r | | |
|---|---|---|---|---|
| q | face only $r_1$ | body only $r_2$ | face and body $r_3$ | solution |
| face only | $F(f_{qr1}, d_b)$ | $F(d_f, d_b)$ | $F(f_{qr3}, d_b)$ | Rank on $F(f_{qr1}, d_b)$, $F(d_f, d_b)$, or $F(f_{qr3}, d_b)$ |
| body only | $F(d_f, d_b)$ | $F(d_f, b_{qr2})$ | $F(d_f, b_{qr3})$ | Rank on $F(d_f, d_b)$, $F(d_f, b_{qr2})$, or $F(d_f, b_{qr3})$ |
| face and body | $F(f_{qr1}, d_b)$ | $F(d_f, b_{qr2})$ | $F(f_{qr3}, b_{qr3})$ | Rank on $F(f_{qr1}, d_b)$, $F(d_f, b_{qr2})$, or $F(f_{qr3}, b_{qr3})$ |

In some examples, the server system 108 may modify at least one of the face similarity score and the body similarity score based on an image quality metric of the query image and/or the gallery image. The image quality metric may be an image resolution. For instance, if the query image or the gallery image has a relatively low image resolution, then the server system 108 may accordingly decrease the face similarity score and/or the body similarity score, to take into account the fact that the relatively low image resolution will decrease the accuracy with which similarities may be established between the query image and the gallery image. Likewise, if the query image or the gallery image has a relatively high image resolution, then the server system 108 may accordingly increase the face similarity score and/or the body similarity score, to take into account the fact that the relatively high image resolution will increase the accuracy with which similarities may be established between the query image and the gallery image. Other types of image quality metrics fall within the scope of the disclosure, such as for example contrast, relative brightness, etc.

In some examples, the server system 108 may adjust at least one of the face similarity score and the body similarity score based on time data associated with the query image and/or the gallery image. The time data may be indicative of when one or more of the query image and the gallery image were taken. For instance, the time data may comprise a date on which the image was taken. The time data may be comprised in the metadata associated with the image.

Using time data may be particularly useful when determining the body similarity score. In particular, within a 24-hour period, a person will typically change their clothing such that, for example, an image of a person's body taken on Monday may differ significantly from an image of the same person's body taken on Tuesday, if the person has changed the clothing covering their torso. Thus, the server system 108 may be configured to determine whether the time data meets a preset criterion. For example, the server system 108 may determine whether the query image and the gallery image were taken on the same day of the week. If not, then the server system 108 may be configured to adjust the body similarity score, for example by decreasing it or else assigning it a default value.

In some examples, as will be described in more detail below, the server system 108 may receive from the user, for example via the input device 114, a selection of one of the ranked gallery images (this particular user input may be referred to as a match confirmation user input). The method set out in FIG. 14 may then be repeated using the selected gallery image as a new query image.

Figure 16:
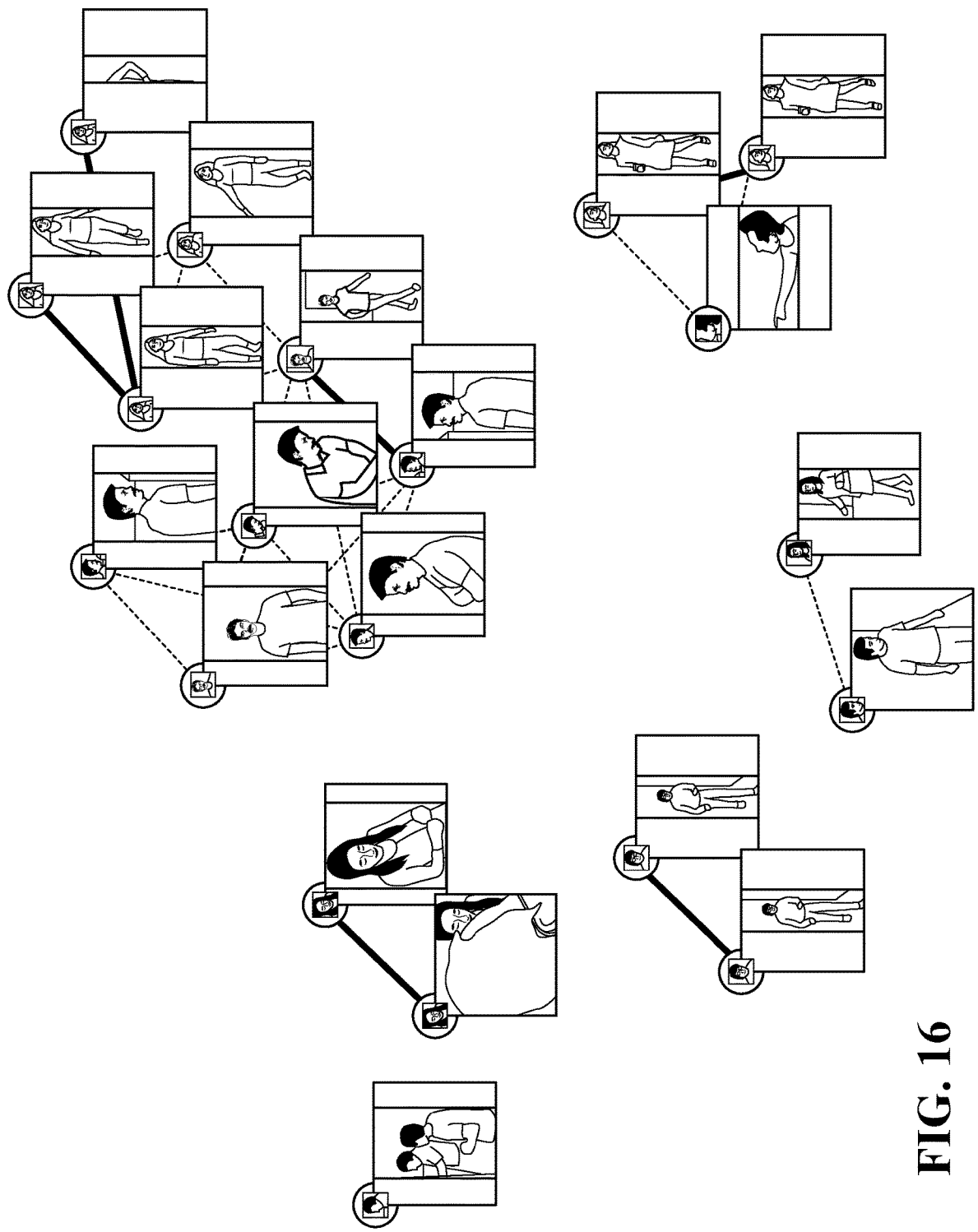
FIGS. 16-18 show data structures comprising nodes interconnected with links, in accordance with an example embodiment of the disclosure.
Figure 17:
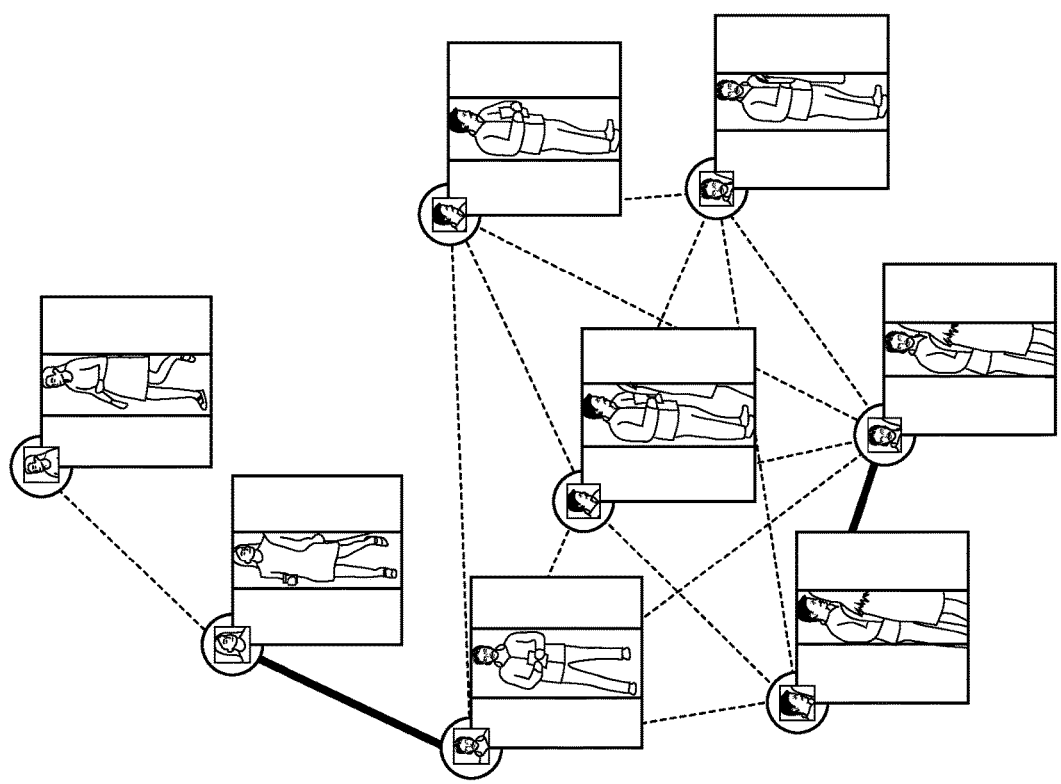
Figure 18:
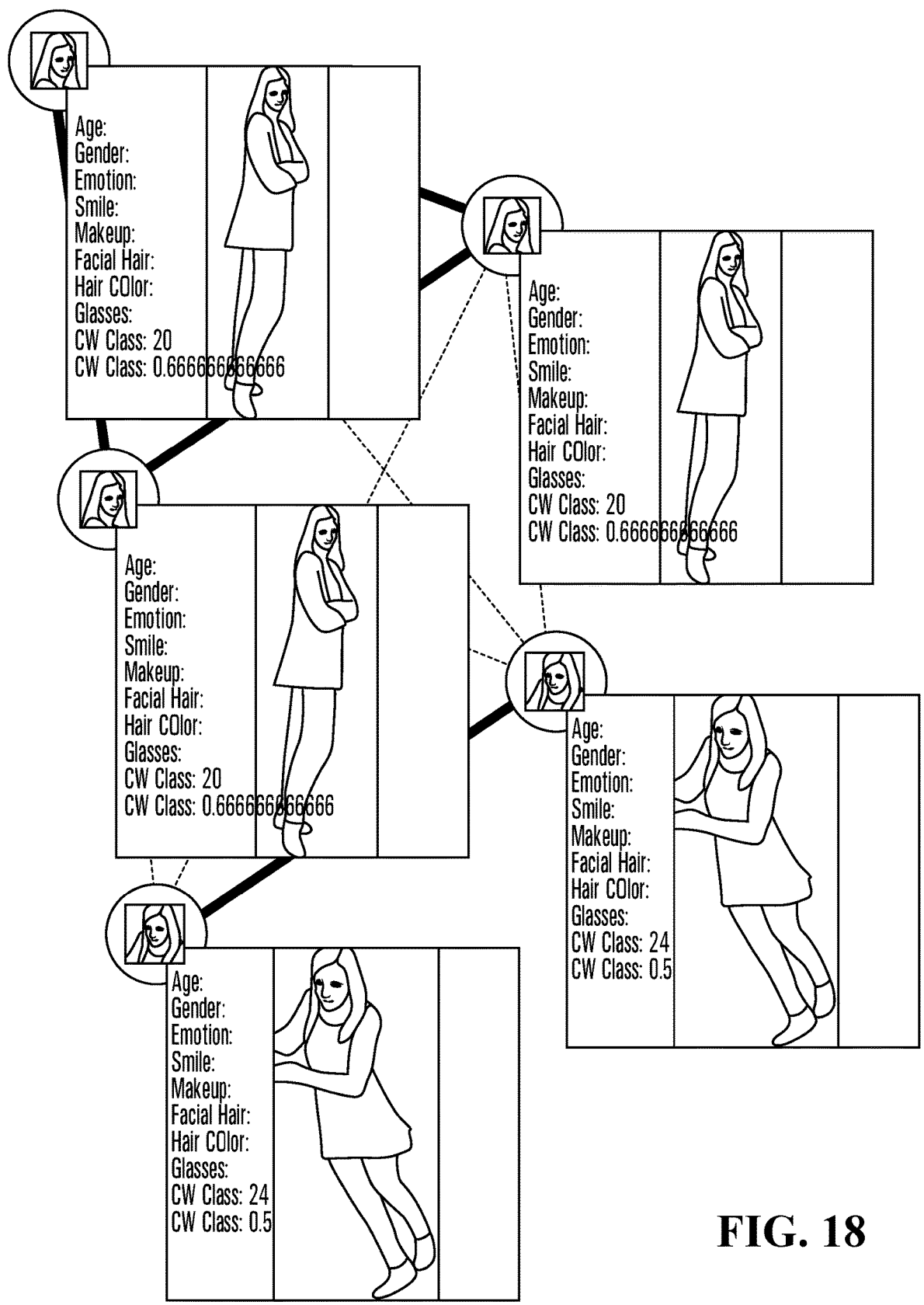

In an alternative example, the search results 406 may be obtained via an alternative method. In this method, a set of query images and a set of gallery images are obtained. The set of query images comprises one or more query images, and the set of gallery images comprises multiple gallery images. Each query image comprises at least a portion of a person-of-interest, and each gallery image comprises at least a portion of a potential person-of-interest. Face similarity scores and body similarity scores of the one or more query images relative to the gallery images are determined. Furthermore, face similarity scores and body similarity scores between at least some of the gallery images are also determined. A data structure comprising nodes and one or more links connecting one or more of the nodes is then generated. Each node is associated with at least one of the one or more query images and the gallery images. One or more pairs of the nodes are connected by one or more links based on one or more of the face similarity scores of the images associated with the one or more node pairs, and/or one or more of the body similarity scores of the images associated with the one or more node pairs. One or more graph partitioning algorithms are then used with the data structure so as to cluster the nodes based on the one or more links. The images associated with at least one of the clustered nodes are then transmitted for display in the form of search results 406. In particular, all images associated with the clustered node with which the query images are associated are displayed. Examples of clustered nodes are shown in FIGS. 16-18. Links based on face similarity are shown in pink, and links based on body similarity are shown gray. Nodes of the same color belong to the same cluster.

The data structure may be referred to as a graph, and is based on the face and body similarities between the images. Each node in the graph comprises an object profile. The object may have a body and a face. The nodes of objects having similar faces are linked, and the nodes of objects having similar bodies are linked. Graph partitioning algorithms are used to identify clusters of object profiles that are strongly inter-connected. Clusters will tend to contain nodes that represent the same object or individual. Images associated with the cluster in which the initial query images find themselves (as a result of the graph partitioning algorithm) are considered to be the most relevant search results. These results may not be directly similar to the queried images, but may be transitively similar to the queried images (for instance, Image A may be similar to Image B, and Image B may be similar to a Query Image).

Suitable graph partitioning methods may include heuristic graph partitioning methods and randomized graph partitioning algorithms with linear complexity, such as the Chinese Whispers randomized graph partitioning algorithm.

Creating the graph may require comparing every image in the searched set (e.g. the set of gallery images) against every other image in the same set. In order to reduce the complexity of this approach, a graph may be built by exploring degrees of similarity from the initial set of query images. For example, given q1 and q2 (0th degree of similarity), compare q1 and q2 to all other object profiles, and keep the top k results, r11, r12, r13 (1st degree of similarity). Then, compare the previous results {r11, r12, r13} to all other object profiles, and keep the most similar results, r21, r22 (2nd degree of similarity). This approach may be used to find the most relevant similarity links without computing all pairwise similarities In addition to building the graph based on face and body similarity scores, the graph may be built using fused similarity scores, as discussed above.

Figure 4:
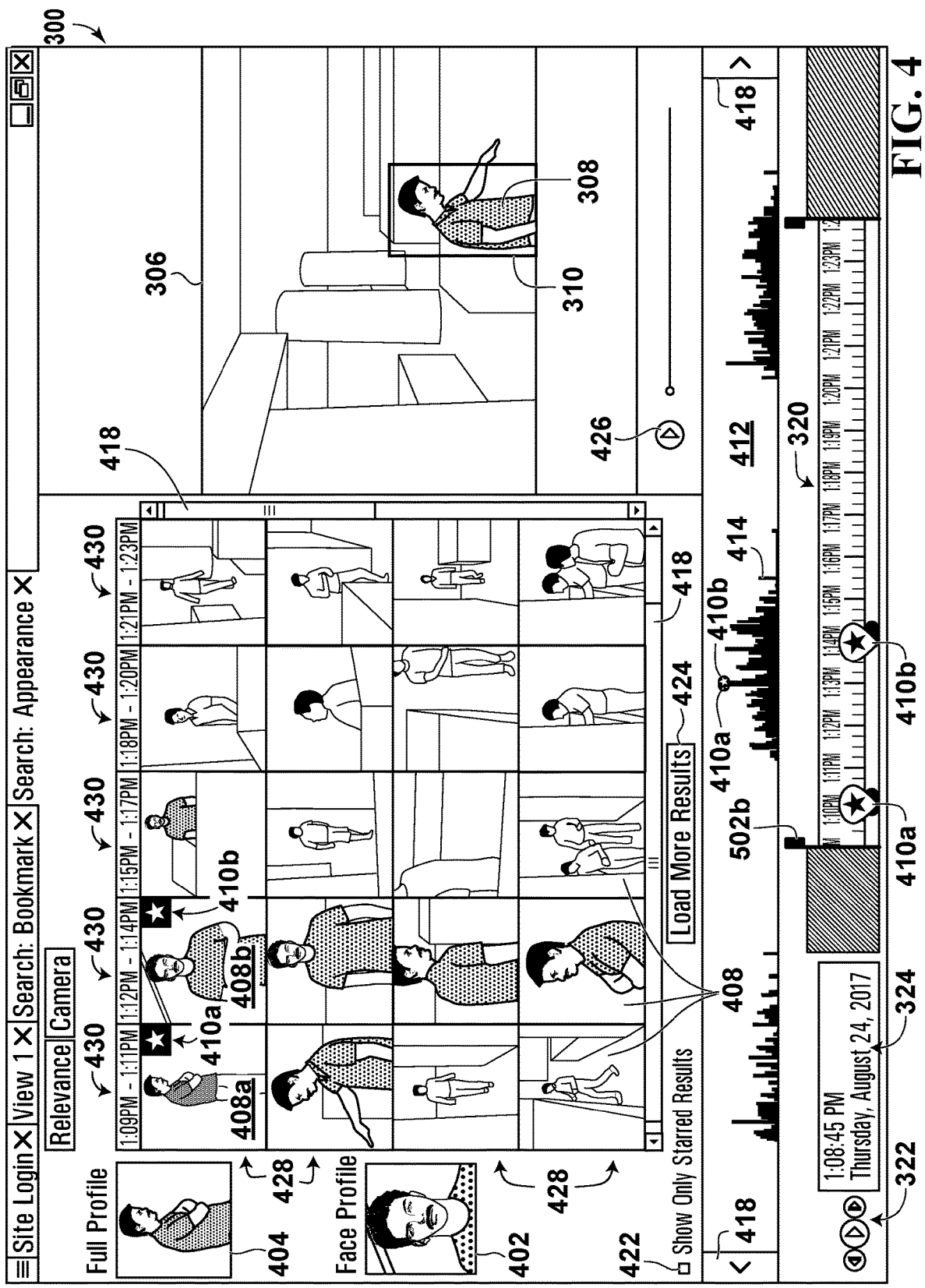
FIG. 4 shows a user interface page including image search results, a face thumbnail, and a body thumbnail of the person-of-interest, generated after a search for the person-of-interest has commenced and before a user has provided match confirmation user input, according to an example embodiment implemented using the client-side video review application of FIG. 2.

Referring now to FIG. 4, the user interface page 300 is shown after the server system 108 has completed a search for the person-of-interest 308, i.e. after the method of FIG. 14 has been carried out. The page 300 concurrently displays the image frame 306 of the selected video recording the user used to commence the search bordering a right edge of the page 300; immediately to the left of the image frame 306, image search results 406 (i.e. the ranked gallery images) selected from the collection of video recordings by the server system 108 as potentially corresponding to the person-of-interest 108; and, immediately to the left of the image search results 406 and bordering a left edge of the page 300, a face thumbnail 402 and a body thumbnail 404 of the person-of-interest 308 (i.e. portions of the query image).

In FIG. 3, the application 144 uses as the body thumbnail 404 at least a portion of the image frame 306 that is contained within the boundary box 310 highlighting the person-of-interest. The application 144 uses as the face thumbnail 402 at least a portion of one of the face search results that satisfy a minimum likelihood that that result correspond to the person-of-interest's 308 face; in one example embodiment, the face thumbnail 402 is drawn from the result of the face search that is most likely to correspond to the person-of-interest's 308 face. Additionally or alternatively, the result used as the basis for the face thumbnail 402 is one of the body search results that satisfies a minimum likelihood that the result correspond to the person-of-interest's 308 body. In another example embodiment, the face thumbnail 402 may be selected as at least a portion of the image frame 306 that is contained within the boundary box 310 highlighting the person-of-interest 308 in FIG. 3.

In FIG. 4, the image search results 406 comprise multiple images arranged in an array comprising n rows 428 and m columns 430, with n=1 corresponding to the array's topmost row 428 and m=1 corresponding to the array's leftmost column 430. The results 406 are positioned in a window along the right and bottom edges of which extend scroll bars 418 that permit the user to scroll through the array. In FIG. 4, the array comprises at least 4×5 images, as that is the portion of the array that is visible without any scrolling using the scroll bars 418.

Each of the columns 430 of the image search results 406 corresponds to a different time period of the collection of video recordings. In the example of FIG. 4, each of the columns 430 corresponds to a three minute duration, with the leftmost column 430 representing search results 406 from 1:09 p.m. to 1:11 p.m., inclusively, the rightmost column 430 representing search results 406 from 1:21 p.m. to 1:23 p.m., inclusively, and the middle three columns 430 representing search results 406 from 1:12 p.m. to 1:20 p.m., inclusively. Additionally, in FIG. 4 each of the image search results 406 is positioned on the display 126 according to a likelihood that the image search result 406 (i.e. the gallery image) corresponds to the person-of-interest 308, based on the fused similarity score obtained for that gallery image. In the embodiment of FIG. 4, the application 144 implements this functionality by making the height of the image search result 406 in the array proportional to the likelihood that image search result 406 corresponds to the person-of-interest 308. Accordingly, for each of the columns 430, the search result 406 located in the topmost row 428 (n=1) is the result 406 for the time period corresponding to that column 430 that is most likely to correspond to the person-of-interest 308, with match likelihood decreasing as n increases.

In the depicted embodiment, all of the search results 406 satisfy a minimum likelihood that they correspond to the person-of-interest 308; for example, in certain embodiments the application 144 only displays search results 406 that have at least a 25% likelihood ("match likelihood threshold") of corresponding to the person-of-interest 308. However, in certain other embodiments, the application 144 may display all search results 406 without taking into account a match likelihood threshold, or may use a non-zero match likelihood threshold that is other than 25%.

In FIG. 4, the body and face thumbnails 404, 402 include at least a portion of a first image 408*a* and a second image 408*b*, respectively, which include part of the image search results 406. The first and second images 408*a*, 408*b*, and accordingly the body and face thumbnails 404, 402, are different in FIG. 4; however, in different embodiments (not depicted), the thumbnails 404, 402 may be based on the same image. Overlaid on the first and second images 408*a*, 408*b* are a first and a second indicator 410*a*, 410*b*, respectively, indicating that the first and second images are the bases for the body and face thumbnails 404, 402. In FIG. 4 the first and second indicators 410*a*, 410*b* are identical stars, although in different embodiments (not depicted) the indicators 410*a*, 410*b* may be different.

Located immediately below the image frame 306 of the selected video recording are play/pause controls 426 that allow the user to play and pause the selected video recording. Located immediately above the horizontal scroll bar 418 beneath the image search results 406 is a load more results button 424, which permits the user to prompt the application 144 for additional tranches of search results 406. For example, in one embodiment, the application 144 may initially deliver at most a certain number of results 406 even if additional results 406 exceed the match likelihood threshold. In that example, the user may request another tranche of results 406 that exceed the match likelihood threshold by selecting the load more results button 424. In certain other embodiments, the application 144 may be configured to display additional results 406 in response to the user's selecting the button 424 even if those additional results 406 are below the match likelihood threshold.

Located below the thumbnails 402, 404 is a filter toggle 422 that permits the user to restrict the image search results 406 to those that the user has confirmed corresponds to the person-of-interest 308 by having provided match confirmation user input to the application 144, as discussed further below.

Spanning the width of the page 300 and located below the thumbnails 402, 404, search results 406, and image frame 306 is an appearance likelihood plot for the person-of-interest 308 in the form of a bar graph 412. The bar graph 412 depicts the likelihood that the person-of-interest 308 appears in the collection of video recordings over a given time span. In FIG. 4, the time span is divided into time periods 416 of one day, and the entire time span is approximately three days (from August 23-25, inclusive). Each of the time periods 416 is further divided into discrete time intervals, each of which is represented by one bar 414 of the bar graph 412. As discussed in further detail below, any one or more of the time span, time periods, and time intervals are adjustable in certain embodiments. The bar graph 412 is bookmarked at its ends by bar graph scroll controls 418, which allow the user to scroll forward and backward in time along the bar graph 412.

To determine the bar graph 412, the server system 108 determines, for each of the time intervals, a likelihood that the person-of-interest 308 appears in the collection of video recordings for the time interval, and then represents that likelihood as the height of the bar 414 for that time interval. In this example embodiment, the server system 108 determines that likelihood as a maximum likelihood that the person-of-interest 308 appears in any one of the collection of video recordings for that time interval. In different embodiments, that likelihood may be determined differently. For example, in one different embodiment the server system 108 determines that likelihood as an average likelihood that the person-of-interest 308 appears in the image search results 406 that satisfy the match likelihood threshold.

In FIG. 4, the first and second indicators 410a, 410b that the application 144 displays on the image search results 406 are also displayed on the bar graph 412 on the bars 414 that correspond to the time intervals during which the first and second images 408a, 408b are captured by the cameras 169, and on the timeline 320 at positions corresponding to those time intervals. This permits the user of the application 144 to quickly identify not only the images 408a, 408b used as the bases for the thumbnails 402, 404, but to be visually presented in three different ways information on when those images 408a, 408b were captured. This may be particularly useful when neither the first image 408a nor second image 408b is currently shown on the display 126 (e.g., they may include part of the image search results 406 but require that the user scroll in order to see them) and therefore the indicators 410a, 410b are visible only on one or both of the bar graph 412 and timeline 320.

While in the depicted embodiment the appearance likelihood plot is shown as comprising the bar graph 412, in different embodiments (not depicted) the plot may take different forms. For example, the plot in different embodiments may include a line graph, with different points on the line graph corresponding to appearance likelihood at different time intervals, or use different colors to indicate different appearance likelihoods.

As in FIG. 3, the page 300 of FIG. 4 also includes the timeline 320, video control buttons 322, and video time indicator 324 extending along the bottom of the page 300.

The application 144 permits the user to provide match confirmation user input regarding whether at least one of the image search results 406 depicts the person-of-interest 308. The user may provide the match confirmation user input by, for example, selecting one of the image search results 406 to display a context menu (not shown) allowing the user to confirm whether that search result 406 depicts the person-of-interest 308. In response to the match confirmation user input, as discussed above the server system 108 may use the selected search result 406 (i.e. the selected gallery image) as a new query image for a performing a new search according to the method of FIG. 14. In particular, the server system 108 in the depicted embodiment determines whether any match likelihoods change and, accordingly, whether positioning of the image search results 406 is to be changed in response to the match confirmation user input. For example, in one embodiment when the user confirms one of the results 406 is a match, the server system 108 may use that confirmed image as a new query image for comparisons when performing one or both of face and body searches. When the positioning of the image search results is to be changed, the application 144 updates the positioning of the image search results 406 in response to the match confirmation user input. For example, the application 144 may delete from the image search results 406 any result the user indicates does not contain the person-of-interest 308 and rearrange the remaining results 406 accordingly. In one example embodiment, one or both of the face and body thumbnails 402, 404 may change in response to the match confirmation user input. In another example embodiment, if the server system 108 is initially unable to identify any faces of the person-of-interest 308 and the application 144 accordingly does not display the face thumbnail 402, the server system 108 may be able to identify the person-of-interest's 308 face after receiving match confirmation user input and the application 144 may then show the face thumbnail 402.

Figure 5:
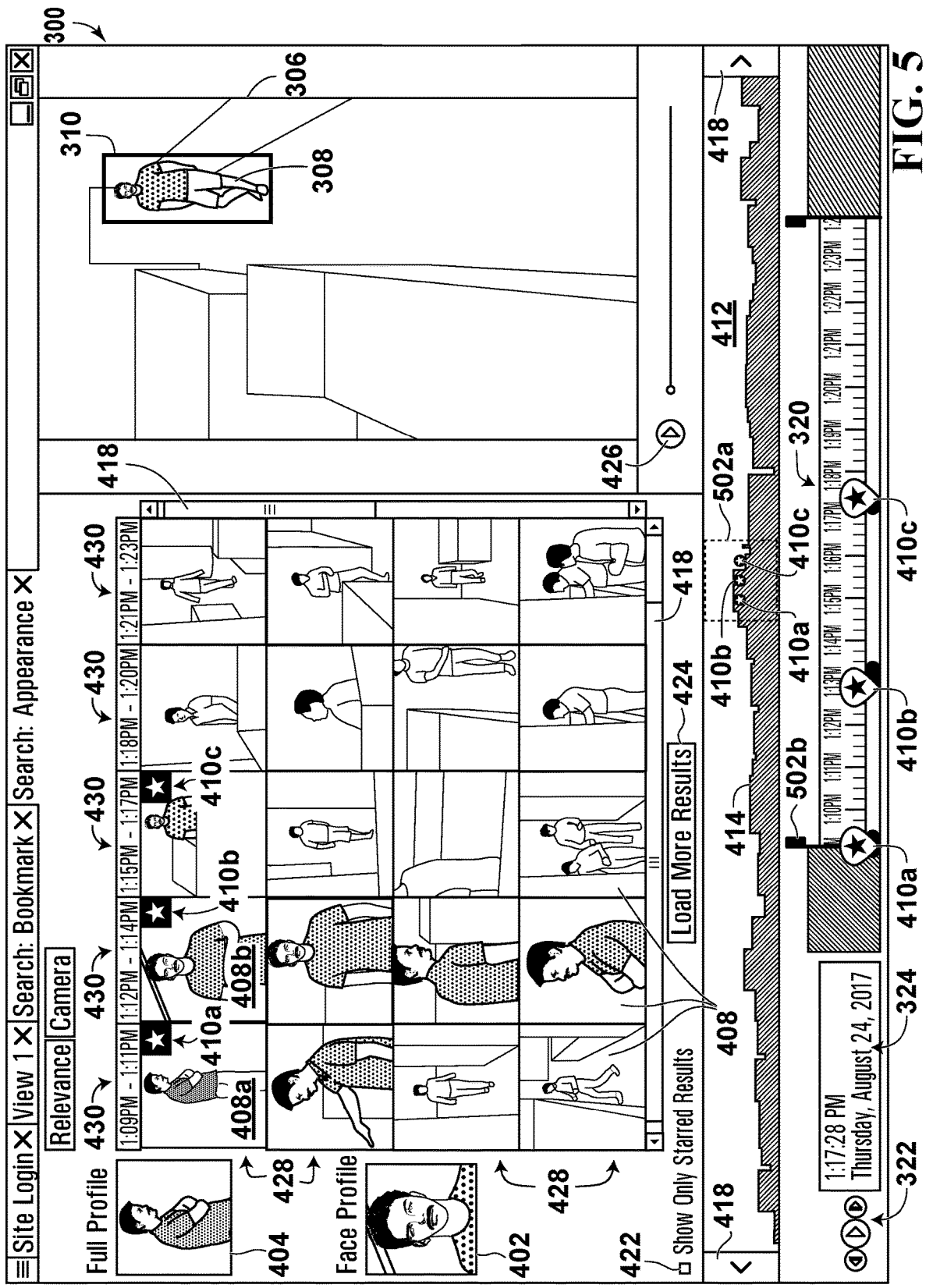
FIG. 5 shows a user interface page including image search results, a face thumbnail, and a body thumbnail of the person-of-interest, generated after a user has provided match confirmation user input, according to an example embodiment implemented using the client-side video review application of FIG. 2.

When the match confirmation user input indicates that any one of the selected image results 406 depicts the person-of-interest 308, the application 144 displays a third indicator 410c over each of the selected image results 406 that the user confirms corresponds to the person-of-interest 308. As shown in the user interface page 300 of FIG. 5, which represents the page 300 of FIG. 4 after the user has provided match confirmation user input, the third indicator 410c in the depicted embodiment is a star and is identical the first and second indicators 410a, 410b. All three indicators 410a-c in FIG. 5 are in the three leftmost columns and the first row of the array of search results 406. In different embodiments (not depicted), any one or more of the first through third indicators 410a-c may be different from each other.

The page 300 of FIG. 5 also shows an appearance likelihood plot resizable selection window 502a and a timeline resizable selection window 502b overlaid on the bar graph 412 and the timeline 320, respectively. The user, by using the input device 114, is able to change the width of and pan each of the windows 502a, 502b by providing window resizing user input. As discussed in further detail below in respect of FIGS. 8A and 8B, the selection windows 502a, 502b are synchronized such that resizing one of the windows 502a, 502b such that it covers a particular time span automatically causes the application 144 to resize the other of the windows 502a, 502b so that it also covers the same time span. Additionally, the application 144 selects the image search results 406 only from the collection of video recordings corresponding to the particular time span that the selection windows 502a, 502b cover. In this way, the user may reposition one of the selection windows 502a, 502b and automatically have the application 144 resize the other of the selection windows 502a, 502b and update the search results 406 accordingly.

Figure 8A:
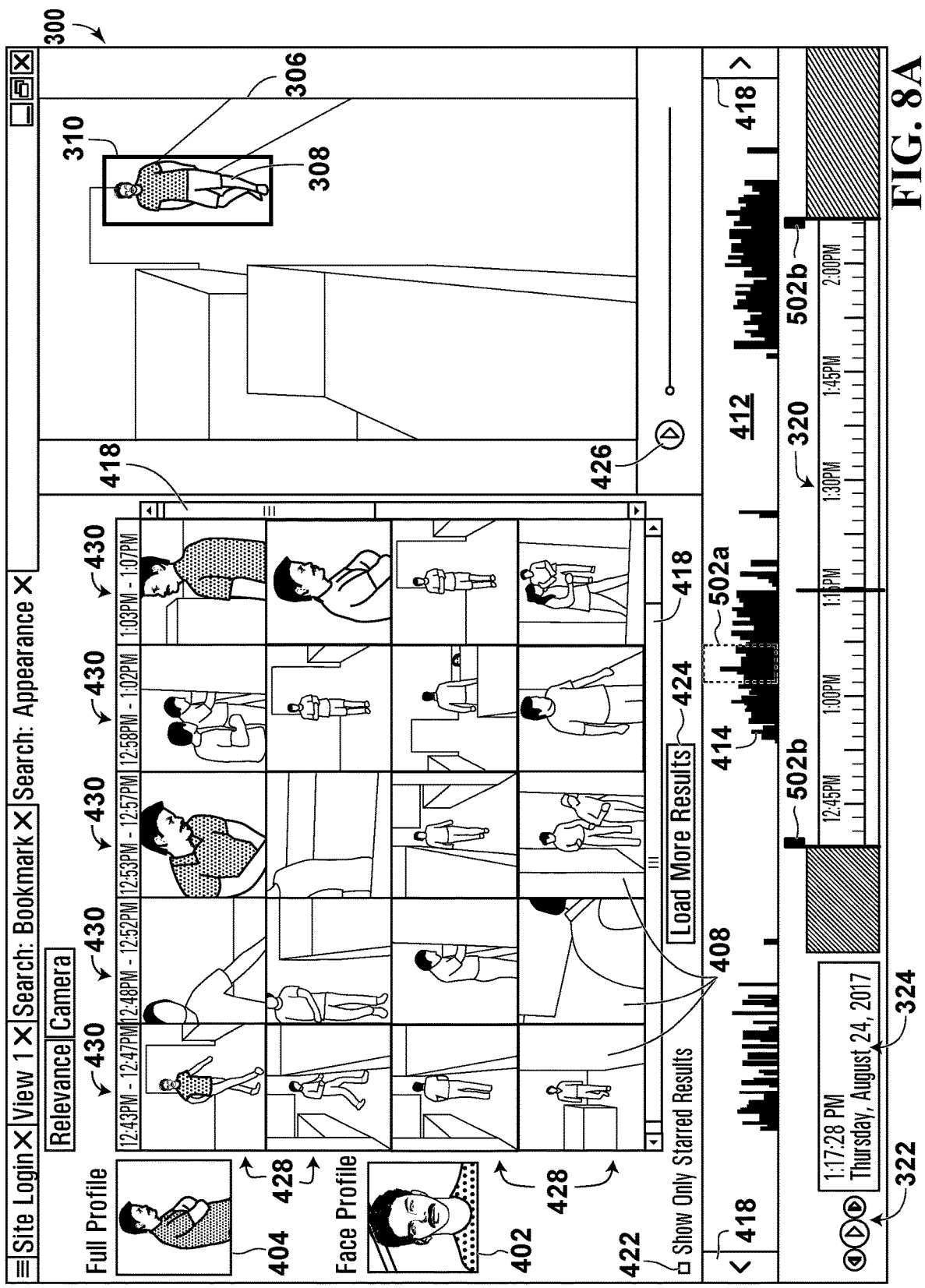
FIGS. 8A and 8B show a user interface page including image search results, a face thumbnail, and a body thumbnail of the person-of-interest in which a resizable window placed over a bar graph representing appearance likelihood is used to select image search results over a first duration (FIG. 8A) and a second, longer duration (FIG. 8B), according to an example embodiment implemented using the client-side video review application of FIG. 2.
Figure 8B:
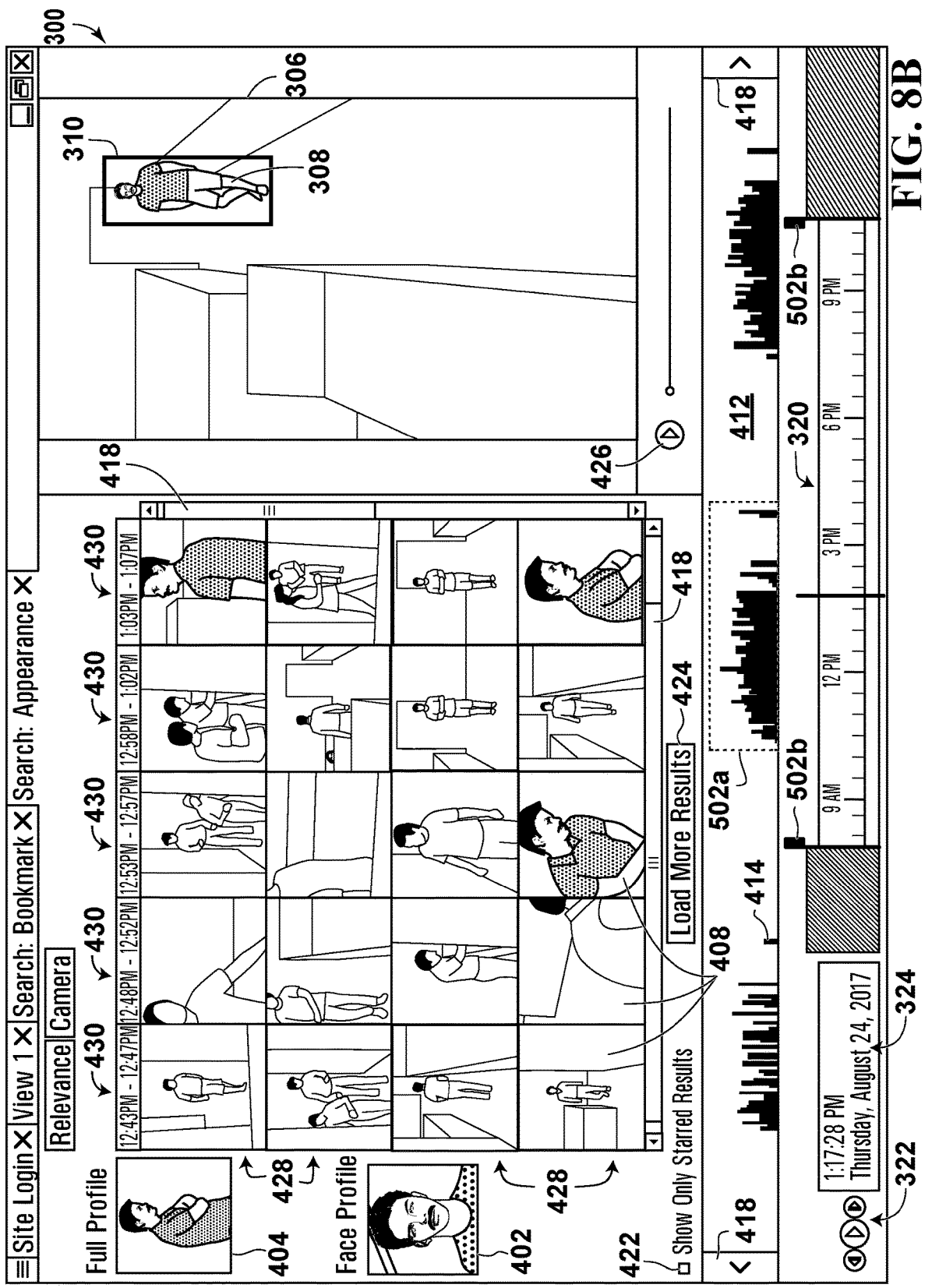

In FIGS. 8A and 8B, the user interface page 300 of FIG. 3 is shown with the resizable selection windows 502a, 502b selected to span a first duration (FIG. 8A, in which only a portion of the search results 406 for August 24$^{th}$ is selected) and a second, longer duration (FIG. 8B, in which substantially all of the search results 406 for August 24th is selected). As described above, the windows 502a, 502b in each of FIGS. 8A and 8B represent the same duration of time because the application 144, in response to the user resizing one of the windows 502a, 502b, automatically resizes the other. Additionally, the array of search results 406 the application 144 displays differs depending on the duration selected by the windows 502a, 502b, since the duration affects how much of the collection of video recordings may be used as a basis for the search results 406.

Figure 6:
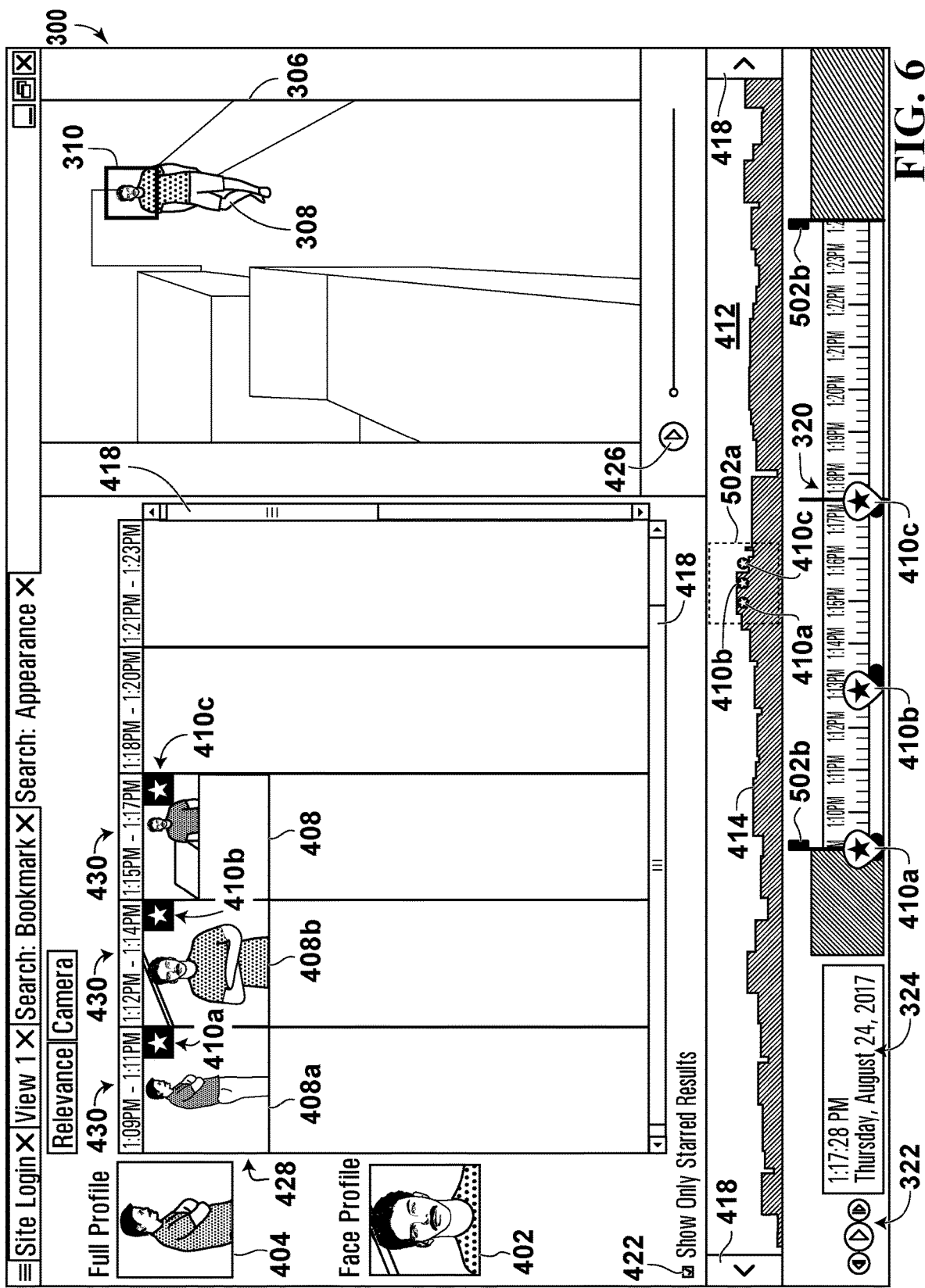
FIG. 6 shows a user interface page including image search results, a face thumbnail, and a body thumbnail of the person-of-interest, with the image search results limited to those a user has indicated show the person-of-interest, according to an example embodiment implemented using the client-side video review application of FIG. 2.

Referring now to FIG. 6, there is shown the user interface page 300 of FIG. 5 after the user has toggled the filter toggle 422 to limit the displayed search results 406 to those that the user has either provided match confirmation user input confirming that those results 406 display the person-of-interest 308 and to those that are used as the bases for the face and body thumbnails 402, 404. As mentioned above, the indicators 410a-c used to highlight the search results 406 in the array is also used to highlight in the bar graph 412 and the timeline 320 when those results 406 were obtained.

Figure 7:
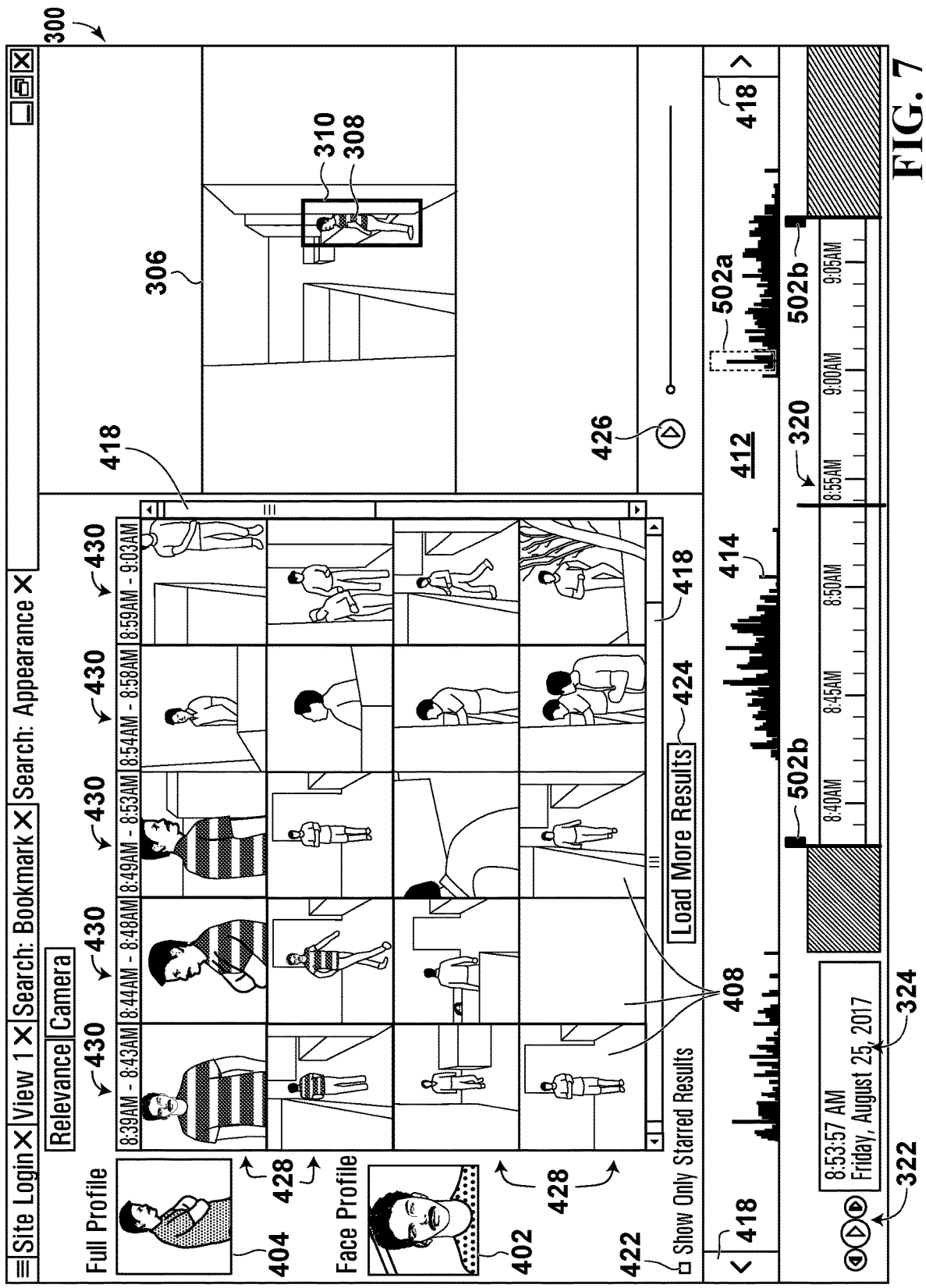
FIG. 7 shows a user interface page including image search results, a face thumbnail, and a body thumbnail of the person-of-interest, with the image search results showing the person-of-interest wearing different clothes than in FIGS. 3-6, according to an example embodiment implemented using the client-side video review application of FIG. 2.

FIG. 7 shows a user interface page including the image search results 406, the face thumbnail 402, and the body thumbnail 404 of the person-of-interest 308, with the image search results 406 showing the person-of-interest 308 wearing different clothes than in FIGS. 3-6. In FIG. 7, the selection windows 502a, 502b have been adjusted so that the image search results are limited to images from August 25th, while the search results 406 depicted in FIGS. 3-6 are limited to images from August 24th. As mentioned above, the server system 108 in the depicted embodiment searches the collection of video recordings for the person-of-interest 308 using both face and body searches, with the body search taking into account the person-of-interest's 308 clothing. Incorporating the face search accordingly helps the server system 108 identify the person-of-interest 308, particularly when his or her clothing is different at different times within one or more of the collection of video recordings or is different across different recordings comprising the collection of video recordings. Because the person-of-interest 308 in the results of FIG. 7 is wearing different clothing than in FIGS. 3-6 and the appearance of his body has accordingly changed, the person-of-interest 308 shown in the image search results 406 of FIG. 7 (such as in the results 406 labeled using reference numeral 702) is accordingly identified primarily using the face search as opposed to the body search.

Figure 9:
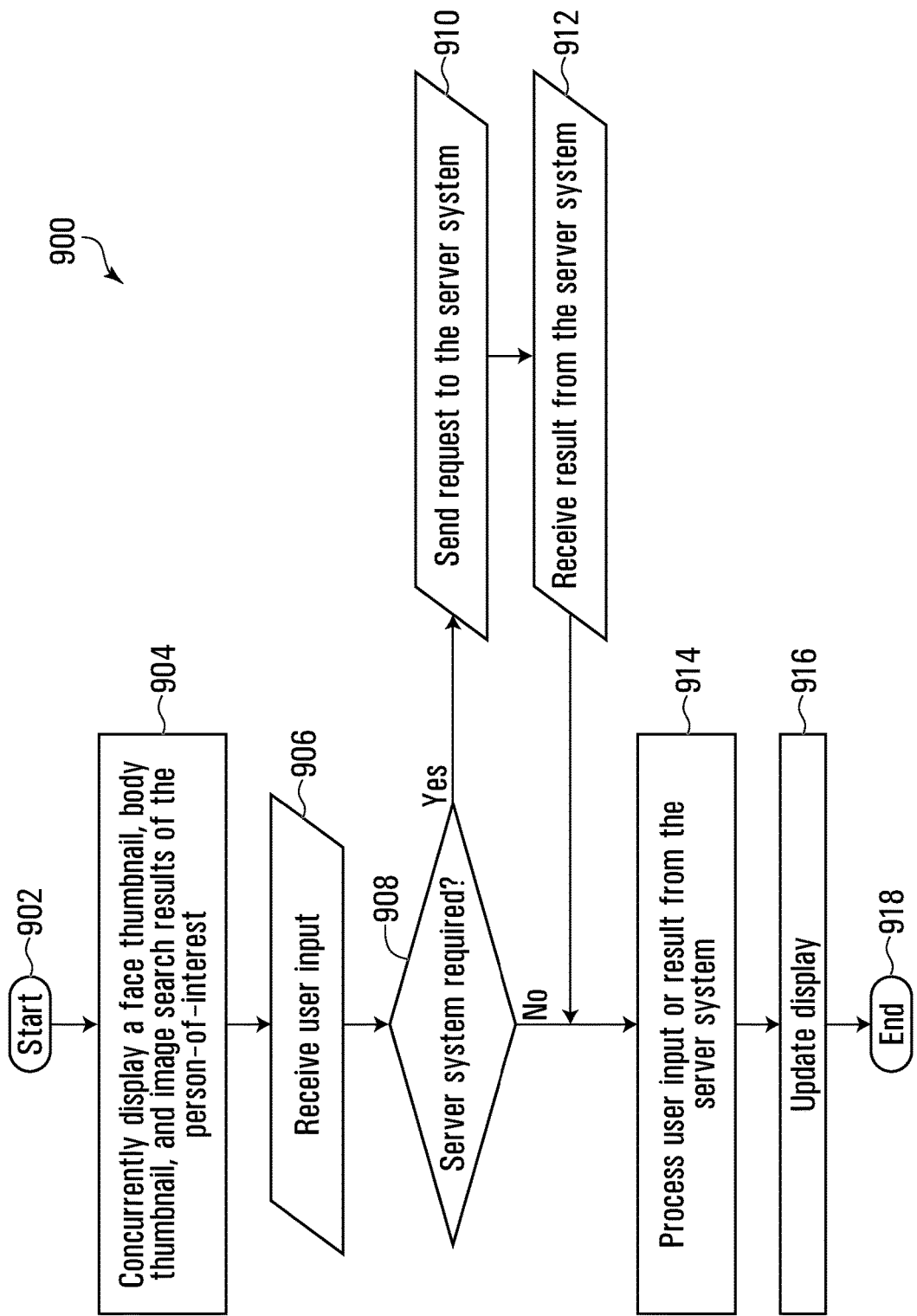
FIG. 9 shows a method for interfacing with a user to facilitate an image search for a person-of-interest, according to another example embodiment.

Referring now to FIG. 9, there is shown a method 900 for interfacing with the user to facilitate an image search for the person-of-interest 308, according to another example embodiment. The method 900 may be expressed as computer program code that implements the application 144 and that is stored in the terminal's 104 non-volatile storage 120. At runtime, the processor 112 loads the computer program code into the RAM 116 and executes the code, thereby performing the method 900.

The method 900 starts at block 902, following which the processor 112 proceeds to block 904 and concurrently displays, on the display 126, the face thumbnail 402, body thumbnail 404, and the image search results 406 of the person-of-interest 308.

The processor 112 proceeds to block 906 where it receives some form of user input; example forms of user input are the match confirmation user input and search commencement user input described above. Additionally or alternatively, the user input may comprise another type of user input, such as any one or more of interaction with the play/pause controls 426, the bar graph 412, and the timeline 320.

Following receiving the user input, the processor proceeds to block 908 where it determines whether the server system 108 is required to process the user input received at block 906. For example, if the user input is scrolling through the image results 406 using the scroll bars 418, then the server system 108 is not required and the processor 112 proceeds directly to block 914 where it processes the user input itself. When processing input in the form of scrolling, the processor 112 determines how to update the array of image results 406 in response to the scrolling and then proceeds to block 916 where it actually updates the display 126 accordingly.

In certain examples, the processor 112 determines that the server system 108 is required to properly process the user input. For example, the user input may include search commencement user input, which results in the server system 108 commencing a new search of the collection of video recordings for the person-of-interest 308, as described above in connection with FIG. 14. In that example, the processor 112 proceeds to block 910 where it sends a request to the server system 108 to process the search commencement user input in the form, for example, of a remote procedure call. At block 912 the processor 112 receives the result from the server system 108, which may include an updated array of image search results 406 and associated images.

The processor 112 subsequently proceeds to block 914 where it determines how to update the display 126 in view of the updated search results 406 and images received from the server system 108 at block 912, and subsequently proceeds to block 916 to actually update the display 126.

Regardless of whether the processor 112 relies on the server system 108 to perform any operations at blocks 910 and 912, a reference herein to the processor 112 or application 144 performing an operation includes an operation that the processor 112 or application 144 performs with assistance from the server system 108, and an operation that the processor 112 or application 144 performs without assistance from the server system 108.

After completing block 916, regardless of whether the processor 112 communicated with the server system 108 in response to the user input, the processor 112 proceeds to block 918 where the method 900 ends.

Facet Search

In at least some example embodiments, the methods, systems, and techniques as described herein are adapted as described further below to search for an object-of-interest. An object-of-interest may comprise the person-of-interest 308 described above in respect of FIGS. 3 to 9 and 14; additionally or alternatively, an object-of-interest may comprise a non-person object, such as a vehicle. More particularly, the server system 108 in at least some example embodiments is configured to perform a "facet search", where a "facet" is a particular visual characteristic of an object-of-interest. For example, when the system 108 is being used to search for a person-of-interest, "facets" of that person-of-interest may comprise any one or more of that person's gender, that person's age, a type of clothing being worn by that person, a color of that clothing, a pattern displayed on that clothing, that person's hair color, that person's hair length, that person's footwear color, and that person's clothing accessories (such as, for example, glasses, a purse, or a bag). Alternatively, or in addition, facets may be used to describe aspects of other objects, such as a vehicle (e.g. car, color of car, size or type of car, vehicle model, etc.).

The system 108 in at least some example embodiments saves the facet in storage 190 as a data structure comprising a "descriptor" and a "tag". The facet descriptor may comprise a text string describing the type of facet, while the facet tag may comprise a value indicating the nature of that facet. For example, when the facet is hair color, the facet descriptor may be "hair color" and the facet tag may be "brown" or another color drawn from a list of colors. Similarly, when the facet is a type of clothing, the facet descriptor may be "clothing type" and the facet tag may be "jacket" or another clothing type drawn from a list of clothing types.

In at least some example embodiments and as described in respect of FIGS. 10A to 11E, the server system 108 is configured to permit a facet search to be done before or after an image search of the type described in respect of FIGS. 3 to 9 and 14. In contrast to the "facet search" workflow depicted in FIGS. 10A to 11E, the image search described in respect of FIGS. 3 to 9 and 14 is hereinafter described as "body/face search", as it is performed based on the person-of-interest's 308 body or face.

Figure 10A:
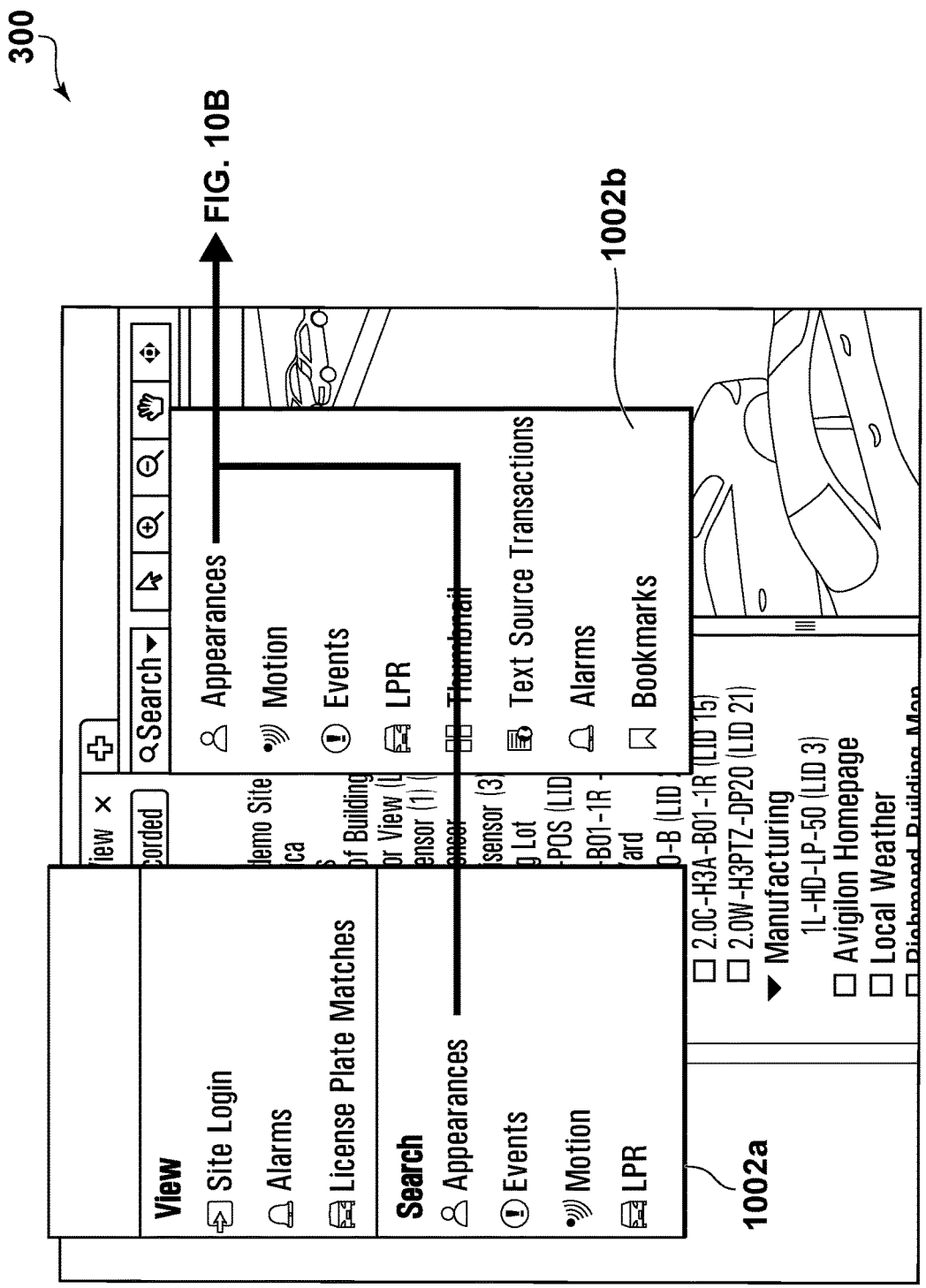
Figure 10C:
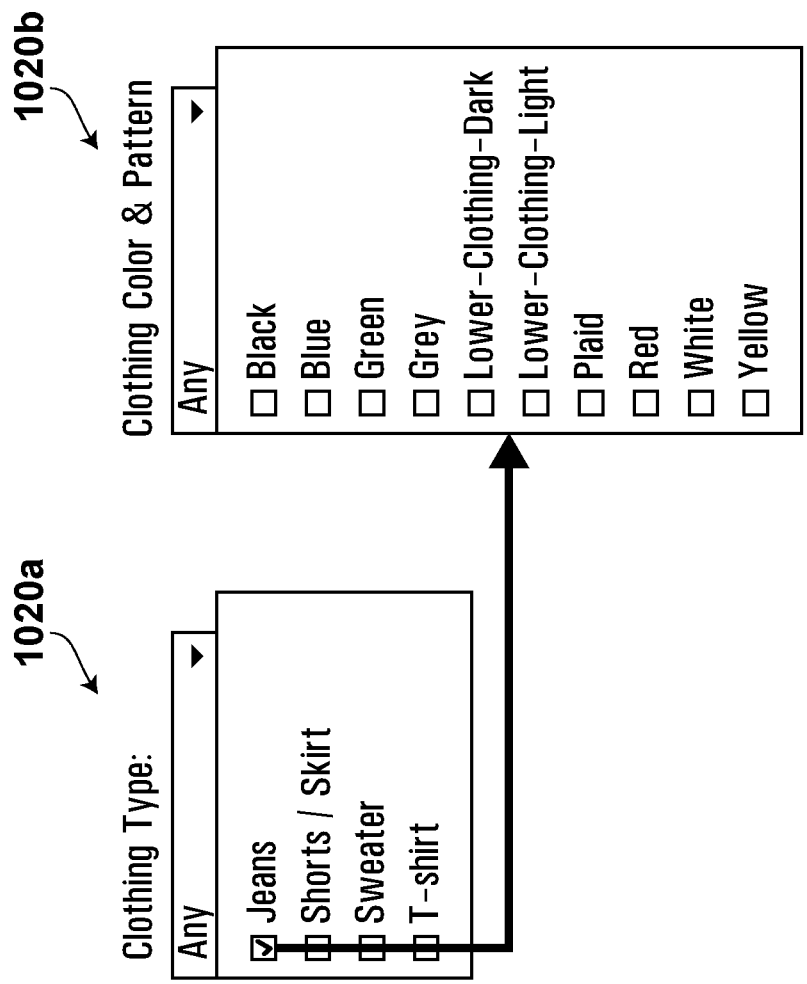

Referring now to FIGS. 10A-10E, there are depicted the user interface page 300 or portions thereof in various states while a facet search is being performed, according to at least one example embodiment. In FIG. 10A, the page 300 comprises a first search menu 1002a and a second search menu 1002b, either of which a user may interact with to commence a facet search. The first menu 1002a is an example of a context menu while the second menu 1002b is an example of a drop-down menu. The user may commence a facet search by selecting the "Appearances" option on either of the menus 1002a,b.

After selecting "Appearances" in FIG. 10A, the user interface displays a facet search menu 1004 as shown in FIG. 10B. The menu 1004 comprises an object-of-interest selector 1008, which in FIG. 10A are radio buttons allowing the user to select an object-of-interest in the form of a person (as selected in FIG. 10A) or a vehicle; various facet selectors 1010; a date range selector 1012, which allows the user to limit the facet search to a specified date range; a camera selector 1014, which allows the user to limit the facet search to particular, specified cameras; and a search button 1006 that, when selected by the user, comprises facet search commencement user input indicating that the facet search is to commence. In at least one different example embodiment, such as that depicted in FIGS. 12A and 12B, the menu 1004 may graphically depict user-selectable images of different hairstyles, upper and lower body clothing types, and different colors to permit the user to select facet descriptors and/or tags.

The facet selectors 1010 allow the user to adjust any one or more of the person-of-interest's 308 gender (selected in FIG. 10A to be male); age (not specified in FIG. 10A); clothing type (selected in FIG. 10A to comprise jeans and a T-shirt); clothing color and/or pattern (selected in FIG. 10A to be red); hair color (not specified in FIG. 10A); footwear color (not specified in FIG. 10A); and accessories (not specified in FIG. 10A) such as, for example, whether the person-of-interest 308 is holding a purse or wearing a hat. In different example embodiments (not depicted), more, fewer, or different facets than those listed in FIG. 10A may be adjustable, for example whether the person is wearing a hat, glasses, or earrings, or has a beard.

FIG. 10O depicts an example clothing type menu 1020a and an example clothing color and/or pattern menu 1020b, which are depicted as example facet selectors 1010 in FIG. 10B. The clothing type menu 1020a allows the user to select any one or more of jeans, shorts/skirt, a sweater, and a T-shirt as facets, and the clothing color and/or pattern menu 1020b allows the user to select any one or more of black, blue, green, grey, dark (lower clothing), light (lower cloth-ing), plaid, red, white, and yellow facets as applied to the person-of-interest's 308 clothing. In at least some example embodiments, the lower clothing selectors of the color and/or pattern menu 1020b are only user selectable if the user has also selected lower body clothing in the clothing type menu 1020a. As shown in FIG. 10O, as the user has selected "jeans" in the clothing type menu 1020a, the user is then free to specify whether the jeans are light or dark in the color and/or pattern menu 1020b. In at least some different example embodiments, a user may select the facet tag (e.g., clothing's color and/or pattern) regardless of whether the facet descriptor has been selected. In the depicted example embodiment, the facet descriptor is "clothing type", while the "facet tag" comprises the various colors and types in the drop-down menus 1020a, 1020b.

In at least some different example embodiments (not depicted), the user interface may differ from that which is depicted. For example, instead of the text-based drop-down menus 1020a, 1020b depicted in FIGS. 10B and 10O, the UI module 202 may present the user with an array of user-selectable images representing the facets available to be searched, analogous to those displayed in FIGS. 12A and 12B. Additionally or alternatively, in at least some example embodiments the clothing type menu 1020a comprises at least one of "Upper Body Clothing" and "Lower Body Clothing", with a corresponding at least one of "Upper Body Clothing Color" and "Lower Body Clothing Color" being depicted in the color and/or pattern menu 1020.

In response to the facet search commencement user input that the user provides by selecting the search button 1006, the system 108 searches one or more of the video recordings for the facets. The system 108 may perform the searching using a suitably trained artificial neural network, such as a convolutional neural network as described above for the body/face search. The system 108 displays, on the display, facet image search results depicting the facets, with the facet image search results being selected from the one or more video recordings that were searched. In at least the depicted example embodiment, the facet image search results depict the facet in conjunction with a common type of object-of-interest common to the image search results.

Figure 10D:
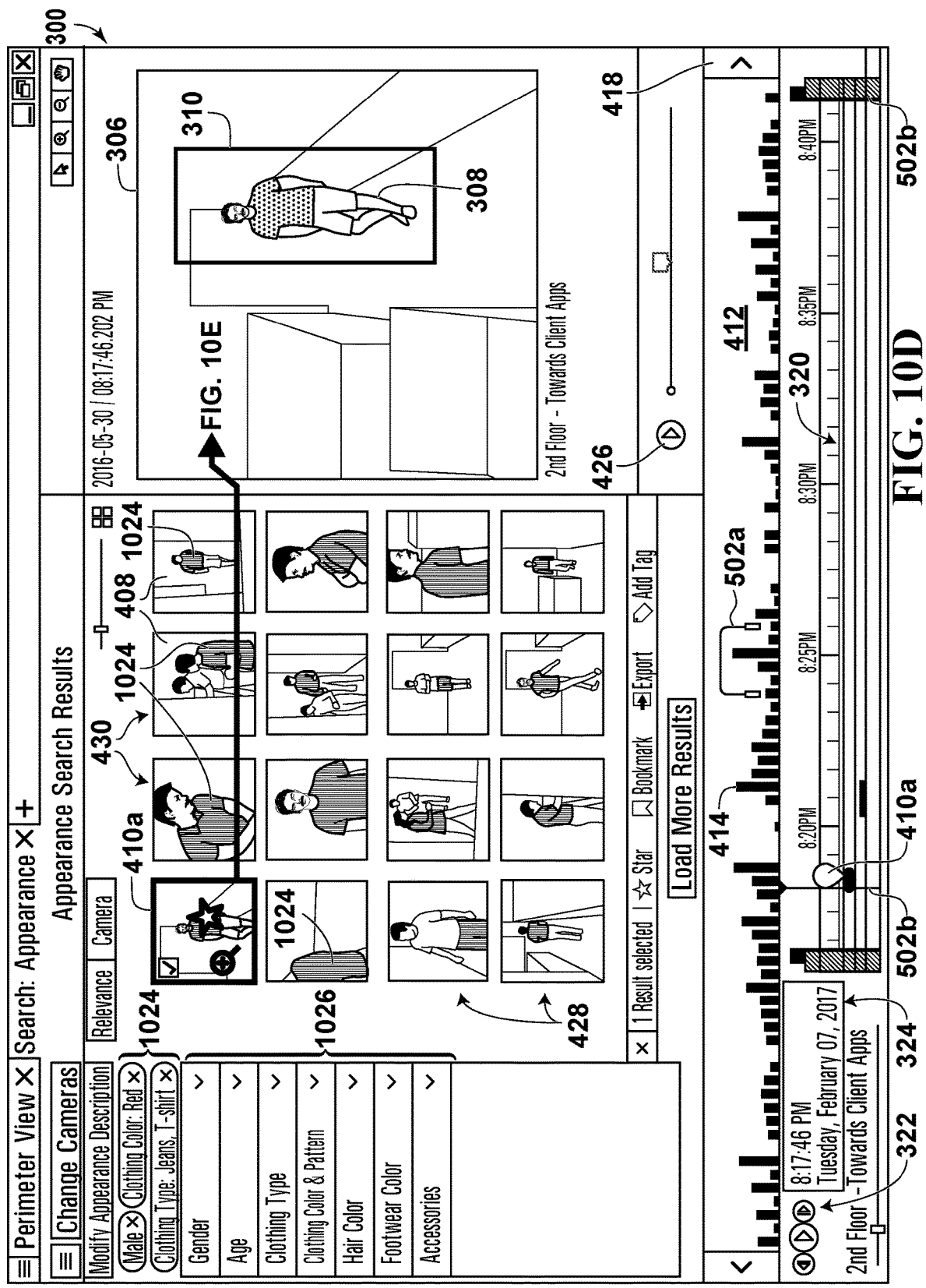

FIG. 10D shows a page 300 depicting the facet image search results using an interface that is analogous to that depicted in FIGS. 4-8B. Similar to the body/face search described above, the images 408 comprising the results are arranged in an array comprising n rows 428 and m columns 430, with images 408 that are more likely to depict the facets shown in higher columns than images 408 that are less likely to depict the facets. In contrast to the embodiments of FIGS. 4-8B, the different columns 430 into which the facet image search results do not correspond to different time periods; instead, the results in each row 428 of the results are ordered by confidence from left (higher confidence) to right (lower confidence). In FIG. 10D, the system 108 searched for a person-of-interest in the form of a man wearing jeans and a T-shirt, with the T-shirt being red, as summarized in a searched facets list 1024 and as specified by the user in the menu 1004 depicted in FIG. 10B.

Each of the entries in the searched facet list 1024 displays an "X" that is user selectable, and that when selected by the user causes that entry in the list 1024 to disappear. Removing a facet from the list 1024 in this manner represents updated facet search commencement user input, and causes the system 108 to update the facet image search results by searching for the updated list of facets. The results of this updated search are displayed in the n×m array of images 408. In at least some example embodiments, the act of removing a facet from the list 1024 in this manner is implemented by the system 108 deleting the contents of a tag associated with the removed facet.

Figures 13A, 13B:
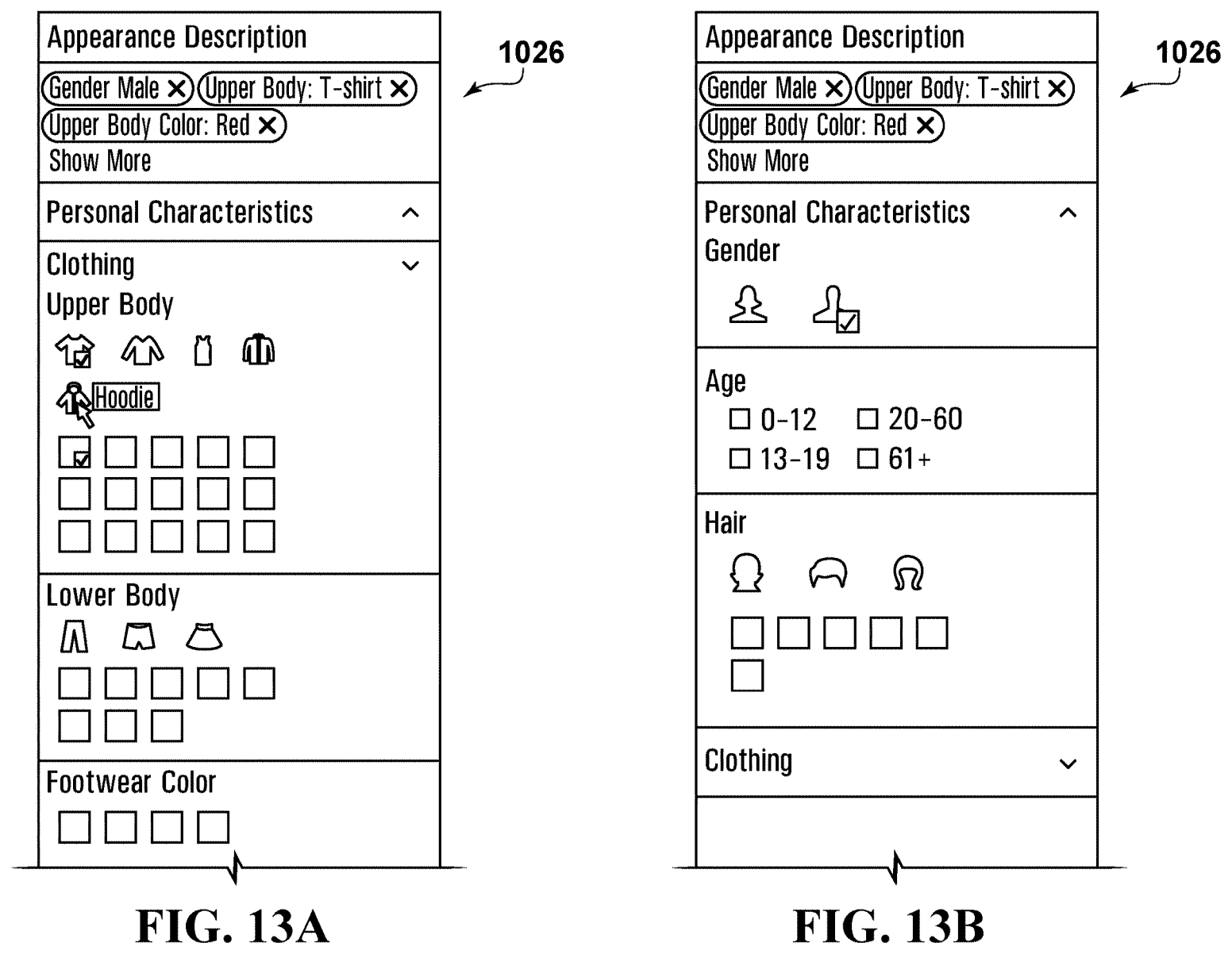

Below the searched facet list 1024 is a series of menus 1026 allowing the user to further revise the list of facets to be searched by adding or removing facets in a manner analogous to that described in respect of the menu 1004 of FIG. 10B. Adding or removing facets in this manner is also an example of updated facet search commencement user input, and accordingly also causes the system 108 to update the facet image search results by searching for the updated list of facets. While the menus 1026 of FIG. 10D comprise drop-down menus, in at least some different example embodiments, such as that depicted in FIGS. 13A and 13B, various user-selectable images depicting possible facets are presented to the user instead of drop-down menus.

The user may commence a body/face search directly from the page 300 of FIG. 10D. In FIG. 10D, the user may select the person-of-interest 308 who will be the subject of the body/face search, which in this case is in the first image 410*a*, and through a context menu (not shown in FIG. 10D) directly commence the body/face search for the person-of-interest 308. In this example, the system's 108 receiving a signal from the user to commence the search through the context menu is an example of object-of-interest search commencement user input.

In response to that object-of-interest search commencement user input, the system 108 searches the one or more video recordings for the object-of-interest. In at least some example embodiments, the search is not restricted to the one or more video recordings from which were selected the facet image search results; for example, the system 108 may search the same video recordings that were searched when performing the facet search. In at least some other example embodiments, the one or more video recordings that are searched are the one or more video recordings from which are selected the facet image search results, and the object-of-interest search results are selected from those one or more video recordings. After the system 108 performs the object-of-interest search, it displays, on the display, the object-of-interest search results. In at least some of those example embodiments in which the object-of-interest search is done on the video recordings that were also searched when performing the facet search, the object-of-interest search results depict the object-of-interest and the facet. The object-of-interest search results are depicted in the user interface page 300 of FIG. 10E, which is analogous to the pages 300 depicted in FIGS. 4-8B.

Figure 10E:
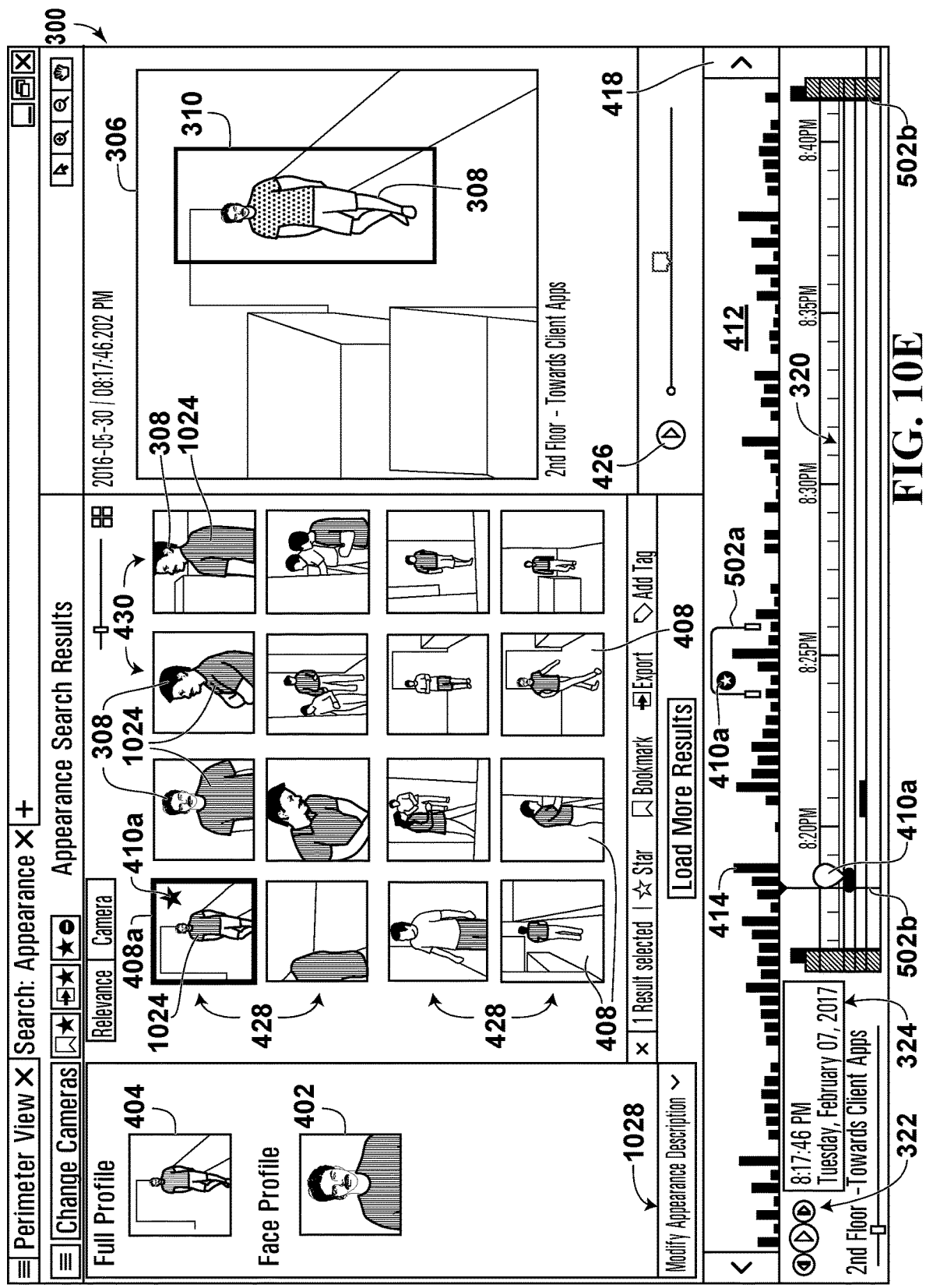

FIG. 10E also depicts a facet modification element 1028 that, when selected, brings up the facet list 1024 and menus 1026 of FIG. 10D to permit the user to modify and re-run the facet search, if desired. In at least some example embodiments, in response to a user's selecting the facet modification element 1028, the list 1024 and menus 1026 are brought up with showing the facet tags on which the depicted facet search results are based.

The object-of-interest search described immediately above is done after one or more facet searches. In at least some example embodiments, the object-of-interest search may be done before a facet search is done. For example, a body/face search may be done, and those image search results displayed, in accordance with the embodiments of FIGS. 4-9 and 14. In at least some example embodiments, the system 108 identifies facets appearing in those image search results, and displays, on the display, a list of those facets. The user then selects a facet comprising the list of facets, which represents facet search commencement user input. The system 108 then searches the one or more video recordings from which are selected the object-of-interest search results for the facet, and subsequently displays facet search results that show the object-of-interest in conjunction with the facet.

Figure 11A:
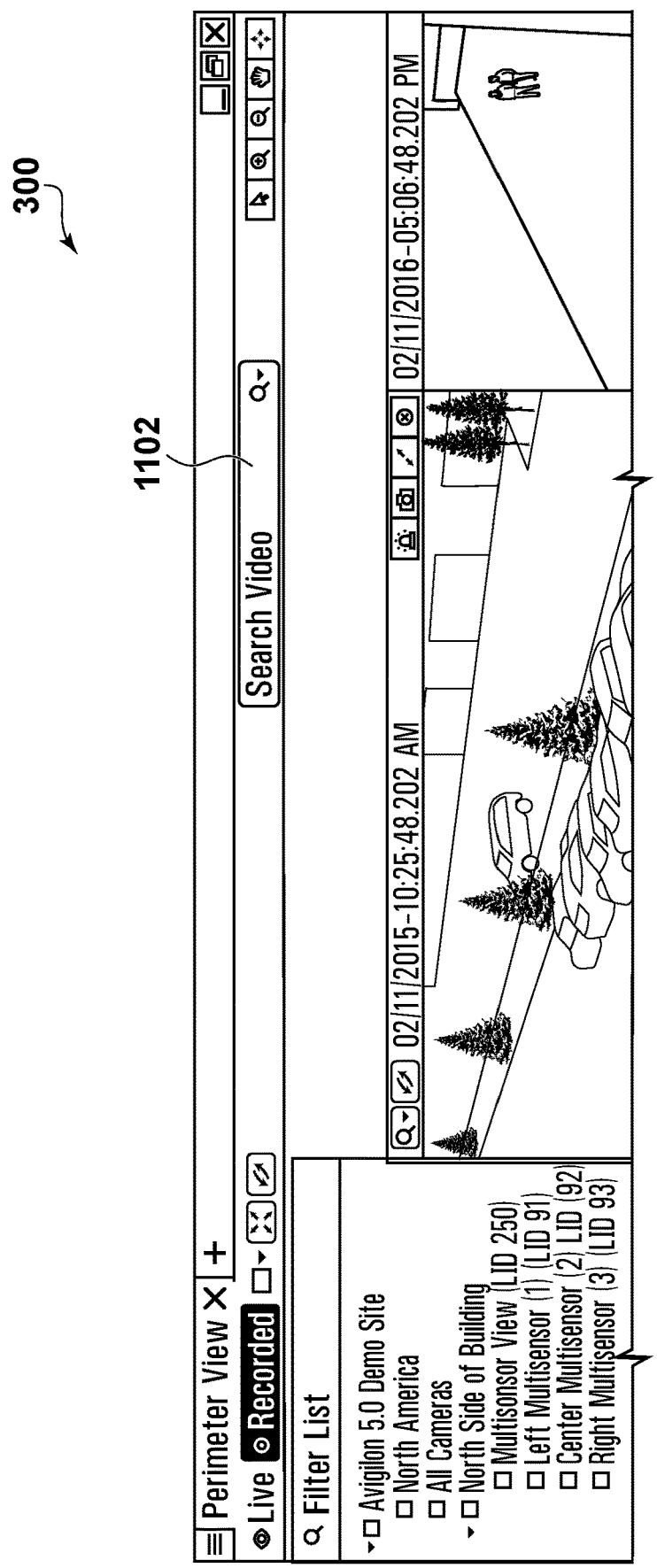

Referring now to FIGS. 11A-11E, there are depicted the user interface page 300 or portions thereof in various states when a natural language facet search is being performed, according to another example embodiment. FIG. 11A depicts the page 300 comprising a natural language search box 1102 configured to receive a natural language text query from the user. The user may input the query using input devices such as a keyboard and/or a dictation tool. In at least some example embodiments, the natural language search processing engine may use any one or more of a context-free grammar parse tree, a dependency grammar parser, a probabilistic parser, and word embedding.

Figure 11C:
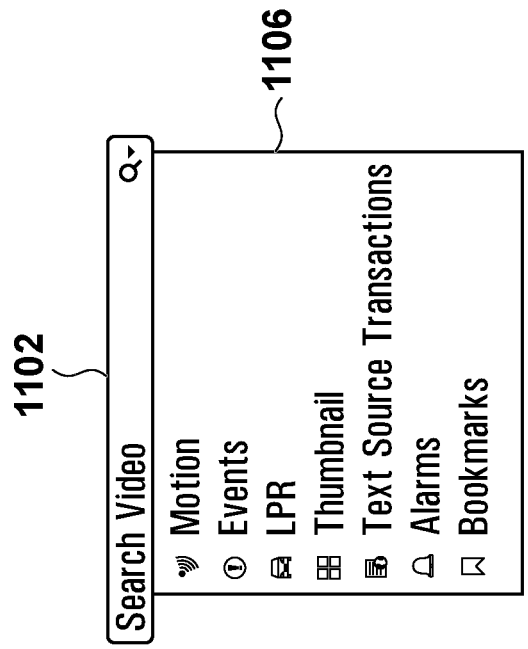
Figure 11B:
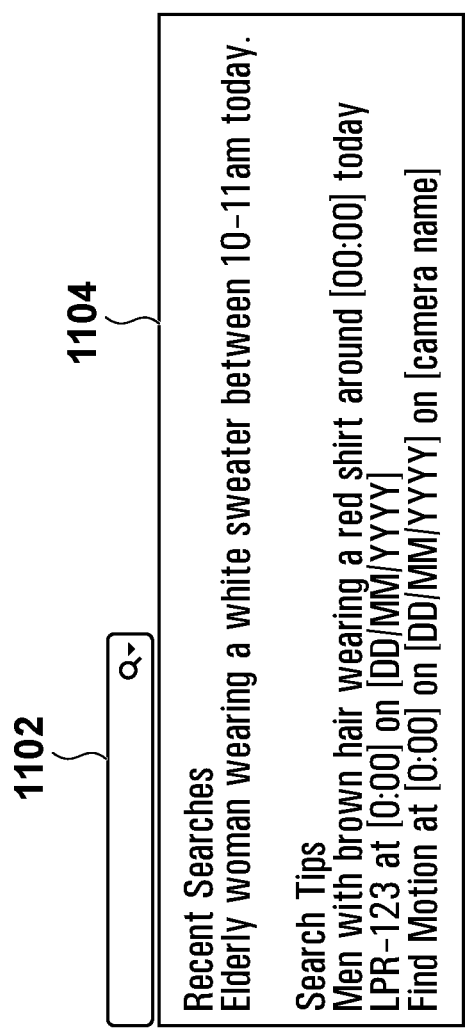
Figure 11D:

FIG. 11B depicts example natural language search queries that the system 108 can process. One example query is "Elderly woman wearing a white sweater between 10-11 am today", in which the object-of-interest is a person, and the facets are her age (elderly), her gender (woman), her type of clothing (a sweater), and her clothing's color (white). Another example query is "Man with brown hair wearing a red shirt around [00:00] today", in which the object-of-interest is again a person, and the facets are his hair color (brown), his type of clothing (a shirt), and his clothing's color (red). The system 108 further constrains the search with non-facet limitations, which in these two examples comprise time and date of the video recordings to be searched. FIG. 11D similarly depicts an example natural language search query for a, "Man with a mustache wearing a red shirt 8-9 pm tod[ay]". In this example, the object-of-interest is a person, and the facets are his mustache, his type of clothing (shirt), and his color of clothing (red), with additional search constraints of time and date.

FIG. 11C depicts various data collections that may be searched in response to a natural language search query. In addition to video, the system 108 may search any one or more of motion, events, license plates, image thumbnails, text, alarms, and bookmarks.

In at least some example embodiments, the system 108 performs a facet search immediately after receiving queries of the type depicted in FIGS. 11B-11D. In at least some different example embodiments, the system 108 first displays the facet search menu 1004 of FIG. 11E to the user in order to confirm the data the system 108 harvested from the natural language search query. The menu 1004 of FIG. 11E displays a search query 1108 displayed verbatim, and the system 108 sets the facet selectors 1010 according to how it interprets the query. The user may manually adjust the selectors 1010 as desired. The menu 1004 also comprises the search button 1006, which, once selected, causes the system 108 to perform the facet search as described above. In at least some different example embodiments such as the one depicted in FIGS. 12A and 12B discussed above, various user-selectable images depicting possible facets are presented to the user instead of drop-down menus shown in FIG. 11E.

The facet search as described above may be performed with an artificial neural network trained as described below. In at least some example embodiments, including the embodiments described below, the artificial neural network comprises a convolutional neural network.

In at least some example embodiments, training images are used to train the convolutional neural network. The user generates a facet image training set that comprises the training images by, for example, selecting images that depict a common type of object-of-interest shown in conjunction with a common type of facet. For example, in at least some example embodiments the system 108 displays a collection of images to the user, and the user selects which of those images depict a type of facet that the user wishes to train the system 108 to recognize. The system 108 may, for example, show the user a set of potential training images, of which a subset depict a person (the object) having brown hair (the facet); the user then selects only those images showing a person with brown hair as the training images comprising the training set. Different training images may show different people, although all of the training images show a common type of object in conjunction with a common type of facet. The training images may comprise image chips derived from images captured by one of the cameras 169, where a "cropped bounding box", or "chip", is a region corresponding to portion of a frame of a selected video recording, such as that portion within a bounding box 310.

Once the facet image training set is generated, it is used to train the artificial neural network to classify the type of facet depicted in the training images comprising the set when a sample image comprising that type of facet is input to the network. An example of a "sample image" is an image comprising part of one of the video recordings searched after the network has been trained, such as in the facet search described above. During training, optimization methods (such as stochastic gradient descent), and numerical gradient computation methods (such as backpropagation) are used to find the set of parameters that minimize the objective function (also known as a loss function). A cross entropy function is used as the objective function in the depicted example embodiments. This function is defined such that it takes high values when it the current trained model is less accurate (i.e., incorrectly classifies facets), and low values when the current trained model is more accurate (i.e., correctly classifies facets). The training process is thus reduced to a minimization problem. The process of finding the most accurate model is the training process, the resulting model with the set of parameters is the trained model, and the set of parameters is not changed once it is deployed. While in some example embodiments the user generates the training set, in other example embodiments a training set is provided to the artificial neural network for training. For example, a third party may provide a training set, and the user may then provide that training set to the artificial neural network.

During training, the system 108 records state data corresponding to different states of the convolutional neural network during the training. In at least some example embodiments, the state data is indexed to index data such as at least one of the common type of facet depicted in the training images, identification credentials of a user who is performing the training, the training images, cameras used to capture the training images, timestamps of the training images, and a time when the training commenced. This allows the state of the convolutional neural network to be rolled back in response to a user request. For example, the system 108 in at least some example embodiments receives index data corresponding to an earlier state of the network, and reverts to that earlier state by loading the state data indexed to the index data for that earlier state. This allows network training to be undone if the user deems it to have been unsuccessful. For example, if the user determines that a particular type of facet is now irrelevant, the network may be reverted to an earlier state prior to when it had been trained to classify that type of facet, thereby potentially saving computational resources. Similarly, a reversion to an earlier network state may be desirable based on time, in which case the index data may comprise the time prior to when undesirable training started, or on operator credentials in order to effectively eliminate poor training done by another user.

Figure 19:
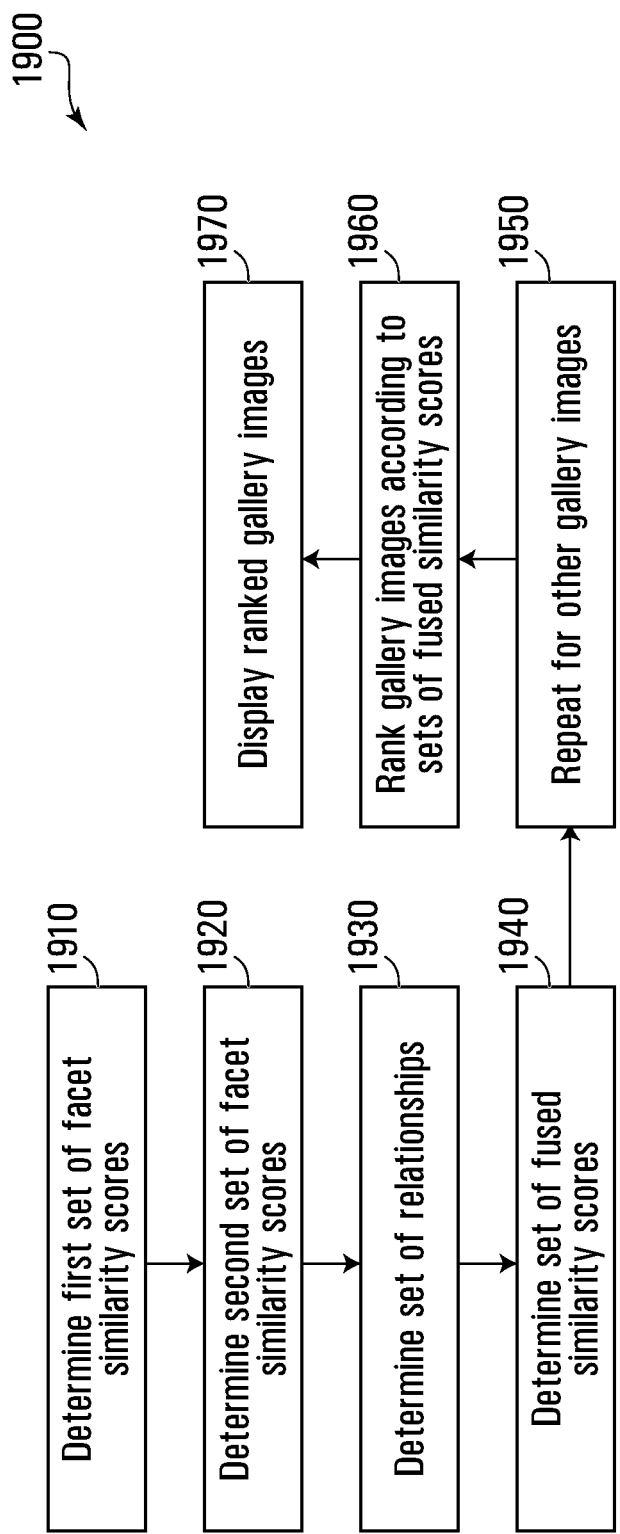
FIG. 19 shows a method of facilitating identification of a person-of-interest, by ranking facet search results as a function of fused similarity scores, in accordance with an example embodiment of the disclosure.

Similarly to the ranking of gallery images based on the body/face search, the server system 108 may rank the results of the facet search. One example method of ranking the results of the facet search is show in FIG. 19. At block 1910, the server system 108 determines a first set of facet similarity scores of the query image relative to the gallery image. The term "relative" is used in the sense that the query image and gallery image are being compared to one another; however, the first set of facet similarity scores is associated with both the query image and the gallery image. At block 1920, the server system 108 determines a second set of facet similarity scores of the query image relative to the gallery image. The order of determining the first set of facet similarity scores and the second set of facet similarity scores is purely exemplary in nature. In other examples, the second set of facet similarity scores may be determined before the first set of facet similarity scores is determined, or both sets of scores may be determined simultaneously. Each set of facet similarity scores may comprise one or more similarity scores for one or more facets. For example, the first and second sets of facet similarity scores may each comprise three similarity scores for three different facets: one for hair, one for shoe colour, and one for shirt colour.

In some examples, in order to determine the first and second sets of facet similarity scores, the server system 108 uses one or more convolutional neural networks. Let the query image be defined by q, and the gallery image be defined by r. q and r are used as inputs to one or more convolutional neural networks. In particular, if the query image comprises both a first facet and a second facet of the person-of-interest, then a portion of the query image comprising the first facet is fed into a first facet convolutional network, and a portion of the query image comprising the second facet is fed into a second facet convolutional network. Similarly, if the gallery image comprises both a first facet and a second facet of the potential person-of-interest, then a portion of the gallery image comprising the first facet is fed into the first facet convolutional network, and a portion of the gallery image comprising the second facet is fed into the second facet convolutional network. The first facet similarity score, $facet1_{qr}$, and the second facet similarity score, $facet2_{qr}$, are then obtained by normalization of the Euclidean distance separating the feature vector of the first facet portion of the query image and the first facet portion of the gallery image, and the Euclidean distance separating the feature vector of the second facet portion of the query image and the second facet portion of the gallery image, respectively. In particular, $$facet1_{qr}, facet2_{qr} = 1 - \frac{\sqrt{\|X - Y\|^2}}{2}$$

wherein X is the feature vector of the query image and Y is the feature vector of the gallery image.

In at least one example embodiment, the cameras 169 generate the metadata and associated feature vectors in or nearly in real-time, and the server system 108 subsequently assesses facet similarity using those feature vectors. However, in at least one alternative example embodiment, the functionality performed by the cameras 169 and server system 108 may be different. For example, functionality may be divided between the server system 108 and cameras 169 in a manner different than as described above. Alternatively, one of the server system 108 and the cameras 169 may generate the feature vectors and assess facet similarity.

At block 1930, the server system 108 determines a set of relationships between the first set of facet similarity scores, the second set of facet similarity scores, and a set of fused similarity scores. The set of fused similarity scores is a function of the first and second sets of facet similarity scores, and each fused similarity score is indicative of whether or not the person-of-interest (in the query image) is the same person as the potential person-of-interest (in the gallery image). Similarly to the determination of the first and second sets of similarity scores, a set neural networks ("fused neural networks") is trained and deployed for determination of the set of fused similarity scores. Note that while typically each pair of corresponding facet similarity scores are fused using a respective fused neural network, in some embodiments a single (or more than one) fused neural network may be use to fuse corresponding facet similarity scores.

In order to train the set of fused neural networks, many reference images of persons-of-interest are used as an input to the set of fused neural networks. Each fused neural network determines reference first facet similarity scores and reference second facet similarity scores for pairs of the reference images. Based on the reference first facet similarity scores and the reference second facet similarity scores, each fused neural network determines a reference fused similarity score by constraining the reference fused similarity score as a function of whether or not the pairs of the reference images comprise at least portions of the same reference persons-of-interest.

In particular, each fused neural network is trained using the following constraint:

$$s = F(facet1_{qr}, facet2_{qr}) = \begin{cases} 1, & q = r \\ 0, & q \neq r \end{cases}$$

wherein s is the reference fused similarity score, $facet1_{qr}$ is the reference first facet similarity score, $facet2_{qr}$ is the reference second facet similarity score, F is the fusion function represented by the fused neural network, q is the query image, and r is the gallery image being compared to q. The fusion function F is effectively the relationship between the first facet similarity score, the second facet similarity score, and the fused similarity score s. In one example, three-layer neural networks are used, with non-linear elements for training. In another example, no-hidden layer neural networks are used, with only linear elements for training. It was found that the performance of no-hidden layer neural networks is similar to that of three-layer neural networks.

In one particular, example, a multi-layer soft-max neural network is used. An example of such a neural network is shown in FIG. 15B, wherein:

$$\begin{bmatrix} a_1 \\ a_2 \end{bmatrix} = \begin{bmatrix} w_{11} & w_{12} \\ w_{21} & w_{22} \end{bmatrix} \begin{bmatrix} facet1_{qr} \\ facet2_{qr} \end{bmatrix} + \begin{bmatrix} b_1 \\ b_2 \end{bmatrix}$$

-continued $$s = \frac{1}{1 + e^{(a_1 - a_2)}}$$

The "w" matrix comprises weights w of the neural network, the "b" matrix comprises biases b of the neural network, the "a" matrix comprises intermediate results a of the neural network, and s is the fused similarity score.

Training of the set of fused neural networks preferably takes place before the first and second sets of facet similarity scores are determined. For example, training of the set of fused neural networks may take place simultaneously as training of the convolutional neural networks discussed above in connection with determining the first and second sets of facet similarity scores.

In some examples, the relationship between the first set of facet similarity scores, the second set of facet similarity scores, and the set of fused similarity scores may be determined by one or more computer devices external to the server system 108, and the set of relationships may be provided to the server system 108 by the one or more external computer devices. For example, the one or more external computer devices may train the set of fused neural networks. In other examples, the server system 108 itself determines the set of relationships, by training the set of fused neural networks using the data set of reference images. The data set may comprise any number of reference images, each reference image comprising at least a portion of a reference person-of-interest. The data set used to train the set of fused neural networks may be the same data set as that used to train the convolutional neural networks, or may be a different data set.

At block 1940, having determined the set of relationships between s, $facet1_{qr}$, and $facet2_{qr}$, the server system 108 determines the set of fused similarity scores of the query image relative to the gallery image. In particular, the server system 108 determines the set of fused similarity scores by applying the set of relationships to the first set of facet similarity scores and the second set of facet similarity scores determined at blocks 1910 and 1920. For example, assuming that the first and second sets of facet similarity scores comprise respective similarity scores for hair colour and shoe colour, then a first relationship (obtained using a first fused neural network) may be used to fuse the similarity scores for hair colour, and a second relationship (obtained using a second fused neural network) may be used to fuse the similarity scores for shoe colour.

At block 1950, the server system 108 repeats blocks 1910, 1920 and 1940 for each other gallery image identified in the recorded video (or portion of recorded video which the user wishes to have analyzed), thereby obtaining a set of fused similarity scores for each gallery image identified in the recorded video/portion of recorded video. At block 1960, the server system 108 ranks the gallery images according to their respective set of fused similarity scores, and at block 1970 instructs display of the ranked gallery images on the display 126 of the computer terminal 104.

In order to rank the gallery images, in each set of fused similarity scores, one or more of the fused similarity scores may be summed. For instance, consider the example where the two gallery images under consideration relate to Person A and Person B. The fused similarity scores for Person A are: male: 0.2, female: 0.8, red: 0.7, blue: 0.3 (four facets in total). The fused similarity scores for Person B are: male: 0.7, female: 0.3, red: 0.9, blue: 0.6 (four facets in total). The user wishes to search for men wearing the colour red. In a search for the facets (male, red), Person B will be returned first, with a score of 1.6, and Person A will be returned second, with a score of 0.9. While both Persons A and B match the query, Person B matches the query better, and so appears at the top of the results list.

In some cases, the query image or the gallery image will not contain any portion of a person that is necessary for the facet to be identified. This would be the case for example if a chosen facet were the presence of eyewear, but the query image and/or the gallery image did not contain any portion of the person's face. In such cases, a default similarity score ($d_f$) may be assigned as the facet similarity score. In one example, the default facet similarity score comprises a median of facet similarity scores determined for the query image relative to other gallery images.

The following table illustrates the ranking of the gallery images according to their fused similarity scores and according to whether a first facet and/or a second facet is present in the query/gallery image:

| | r | | | |
|---|---|---|---|---|
| q | first facet only $r_1$ | second facet only $r_2$ | first and second facets $r_3$ | solution |
| first facet only | $F(facet1_{qr1}, d_b)$ | $F(d_f, d_b)$ | $F(facet1_{qr3}, d_b)$ | Rank on $F(facet1_{qr1}, d_b)$, $F(d_f, d_b)$, or $F(facet1_{qr3}, d_b)$ |
| second facet only | $F(d_f, d_b)$ | $F(d_f, facet2_{qr2})$ | $F(d_f, facet2_{qr3})$ | Rank on $F(d_f, d_b)$, $F(d_f, facet2_{qr2})$, or $F(d_f, facet2_{qr3})$ |
| first and second facets | $F(facet1_{qr1}, d_b)$ | $F(d_f, facet2_{qr2})$ | $F(facet1_{qr3}, facet2_{qr3})$ | Rank on $F(facet1_{qr1}, d_b)$, $F(d_f, facet2_{qr2})$, or $F(facet1_{qr3}, facet2_{qr3})$ |

In some examples, the server system 108 may modify at least one of the first set of facet similarity scores and the second set of facet similarity scores based on an image quality metric of the query image and/or the gallery image. The image quality metric may be an image resolution. For instance, if the query image or the gallery image has a relatively low image resolution, then the server system 108 may accordingly decrease the one or more similarity scores in the first and/or second sets of facet similarity scores, to take into account the fact that the relatively low image resolution will decrease the accuracy with which similarities may be established between the query image and the gallery image. Likewise, if the query image or the gallery image has a relatively high image resolution, then the server system 108 may accordingly increase the one or more similarity scores in the first and/or second sets of facet similarity scores, to take into account the fact that the relatively high image resolution will increase the accuracy with which similarities may be established between the query image and the gallery image. Other types of image quality metrics fall within the scope of the disclosure, such as for example contrast, relative brightness, etc.

In some examples, the server system 108 may adjust at least one of the first set of facet similarity scores and the second set of facet similarity scores based on time data associated with the query image and/or the gallery image. The time data may be indicative of when one or more of the query image and the gallery image were taken. For instance, the time data may comprise a date on which the image was taken. The time data may be comprised in the metadata associated with the image.

Using time data may be particularly useful when determining facet similarity scores for facets related to a person's body. In particular, within a 24-hour period, a person will typically change their clothing such that, for example, an image of a person's body taken on Monday may differ significantly from an image of the same person's body taken on Tuesday, if the person has changed the clothing covering their torso. Thus, the server system 108 may be configured to determine whether the time data meets a preset criterion. For example, the server system 108 may determine whether the query image and the gallery image were taken on the same day of the week. If not, then the server system 108 may be configured to adjust the relevant facet similarity score(s), for example by decreasing it or else assigning it a default value.

In some examples, as described above, the server system 108 may receive from the user, for example via the input device 114, a selection of one of the ranked gallery images (this particular user input may be referred to as a match confirmation user input). The method set out in FIG. 19 may then be repeated using the selected gallery image as a new query image.

In some examples, one or more of the facet similarity scores and/or one or more of the fused similarity scores may be adjusted based upon the facet under consideration. For example, the neural network responsible for determining similarity scores for the presence of a hat may be better than the neural network responsible for determining similarity scores for the colour of a person's shoe. In such a case, the similarity scores (facet similarity scores and/or fused similarity scores) relating to the facet of the presence of a hat may be weighed more heavily than those relating to the facet of the colour of the person's shoe.

In other examples, a facet similarity score may be fused with a face similarity score and/or a body similarity score. In other words, the methods of FIGS. 11 and 19 may be combined in such a way that facet similarity scores, body similarity scores and face similarity scores may be fused in order to better rank search results.

In an alternative example, the search results 406 may be obtained via an alternative method. In this method, a set of query images and a set of gallery images are obtained. The set of query images comprises one or more query images, and the set of gallery images comprises multiple gallery images. Each query image comprises at least a portion of a person-of-interest, and each gallery image comprises at least a portion of a potential person-of-interest. First and second sets of facet similarity scores of the one or more query images relative to the gallery images are determined. Furthermore, first and second sets of facet similarity scores between at least some of the gallery images are also determined. A data structure comprising nodes and one or more links connecting one or more of the nodes is then generated. Each node is associated with at least one of the one or more query images and the gallery images. One or more pairs of the nodes are connected by one or more links based on one or more of the first set of facet similarity scores of the images associated with the one or more node pairs, and/or one or more of the second set of facet similarity scores of the images associated with the one or more node pairs. One or more graph partitioning algorithms are then used with the data structure so as to cluster the nodes based on the one or more links. The images associated with at least one of the clustered nodes are then transmitted for display in the form of search results 406. In particular, all images associated with the clustered node with which the query images are associated are displayed. Examples of clustered nodes are shown in FIGS. 16-18. Links based on face similarity are shown in solid lines, and links based on body similarity are shown dashed lines. Nodes of the same color belong to the same cluster.

The data structure may be referred to as a graph, and is based on the facet similarities between the images. Each node in the graph comprises an object profile. The object may have a first facet and a second facet. The nodes of objects having similar first facets are linked, and the nodes of objects having similar second facets are linked. Graph partitioning algorithms are used to identify clusters of object profiles that are strongly inter-connected. Clusters will tend to contain nodes that represent the same object or individual. Images associated with the cluster in which the initial query images find themselves (as a result of the graph partitioning algorithm) are considered to be the most relevant search results. These results may not be directly similar to the queried images, but may be transitively similar to the queried images (for instance, Image A may be similar to Image B, and Image B may be similar to a Query Image).

Suitable graph partitioning methods may include heuristic graph partitioning methods and randomized graph partitioning algorithms with linear complexity, such as the Chinese Whispers randomized graph partitioning algorithm.

Creating the graph may require comparing every image in the searched set (e.g. the set of gallery images) against every other image in the same set. In order to reduce the complexity of this approach, a graph may be built by exploring degrees of similarity from the initial set of query images. For example, given q1 and q2 (0th degree of similarity), compare q1 and q2 to all other object profiles, and keep the top k results, r11, r12, r13 (1st degree of similarity). Then, compare the previous results {r11, r12, r13} to all other object profiles, and keep the most similar results, r21, r22 (2nd degree of similarity). This approach may be used to find the most relevant similarity links without computing all pairwise similarities.

In addition to building the graph based on facet similarity scores, the graph may be built using fused similarity scores, as discussed above.

Certain adaptations and modifications of the described embodiments can be made. For example, with respect to either the client-side video review application 144 (FIGS. 1 and 2), these have been herein described as packaged software installed on the client terminal 104; however in some alternative example embodiments implementation of the UI can be achieved with less installed software through the use of a web browser application (e.g. one of the other applications 152 shown in FIG. 1). A web browser application is a program used to view, download, upload, surf, and/or otherwise access documents (for example, web pages). In some examples, the browser application may be the well-known Microsoft® Internet Explorer®. Of course other types of browser applications are also equally possible including, for example, Google® Chrome™. The browser application reads pages that are marked up (for example, in HTML). Also, the browser application interprets the marked up pages into what the user sees rendered as a web page. The browser application could be run on the computer terminal 104 to cooperate with software components on the server system 108 in order to enable a computer terminal user to carry out actions related to providing input in order to facilitate identifying same individuals or objects appearing in a plurality of different video recordings. In such circumstances, the user of the computer terminal 104 is provided with an alternative example user interface through which the user inputs and receives information in relation to the video recordings.

Although example embodiments have described a reference image for a search as being taken from an image within recorded video, in some example embodiments it may be possible to conduct a search based on a scanned photograph or still image taken by a digital camera. This may be particularly true where the photo or other image is, for example, taken recent enough such that the clothing and appearance is likely to be the same as what may be found in the video recordings.

Therefore, the above discussed embodiments are considered to be illustrative and not restrictive, and the invention should be construed as limited only by the appended claims.

The invention claimed is:

1. A method of facilitating identification of a person-of-interest, comprising:
   for each of multiple gallery images:
      determining a face similarity score of a query image relative to the gallery image, wherein the query image comprises at least a portion of a person-of-interest, and wherein the gallery image comprises at least a portion of a potential person-of-interest;
      determining a body similarity score of the query image relative to the gallery image; and
      determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest;
   ranking the gallery images according to each fused similarity score of the respective gallery images; and
   transmitting the gallery images for display according to the ranking,
   wherein at least one of:
      (1) determining the face similarity score comprises:
         determining whether either a face of the person-of-interest is absent from the query image or a face of the potential person-of-interest is absent from the gallery image; and
         if so, determining the face similarity score to be a default face similarity score; and
      (2) determining the body similarity score comprises:
         determining whether either a body of the person-of-interest is absent from the query image or a body of the potential person-of-interest is absent from the gallery image; and
         if so, determining the body similarity score to be a default body similarity score.

2. The method of claim 1, further comprising determining the relationship.

3. The method of claim 2, wherein determining the relationship comprises:
   determining reference face similarity scores and reference body similarity scores for pairs of multiple reference images, wherein each reference image comprises at least a portion of a reference person-of-interest;
   determining, based on the reference face similarity scores and the reference body similarity scores, reference fused similarity scores by constraining the reference fused similarity scores as a function of whether or not the pairs of the reference images comprise at least portions of the same reference persons-of-interest; and determining the relationship based on the reference face similarity scores, the reference body similarity scores and the reference fused similarity scores.

4. The method of claim 3, wherein one or more of the determining the reference face similarity scores and the reference body similarity scores, the determining the reference fused similarity scores, and the determining the relationship, are performed by a machine learning module configured to implement a machine learning process.

5. The method of claim 4, wherein the machine learning module is configured to implement a neural network to which are input the multiple reference images.

6. The method of claim 5, wherein the neural network is a multi-layer, soft-max neural network.

7. The method of claim 1, wherein determining one or more of the face similarity score and the body similarity score comprises:
using a convolutional neural network to determine one or more similarity signatures between the query image and the gallery image; and
determining one or more separations between the one or more similarity signatures, wherein one or more of the face similarity score and the body similarity score are a function of the one or more separations.

8. The method of claim 1, wherein the at least a portion of the person-of-interest comprises at least a portion of: a body of the person-of-interest; a torso of the person-of-interest; a face of the person-of-interest; and a body and a face of the person-of-interest.

9. The method of claim 1, wherein the at least a portion of the potential person-of-interest comprises at least a portion of: a body of the potential person-of-interest; a torso of the potential person-of-interest; a face of the potential person-of-interest; and a body and a face of the potential person-of-interest.

10. The method of claim 1, wherein determining the face similarity score comprises:
determining whether either a face of the person-of-interest is absent from the query image or a face of the potential person-of-interest is absent from the gallery image; and
if so, determining the face similarity score to be a default face similarity score.

11. The method of claim 10, wherein the default face similarity score comprises a median of face similarity scores determined for the query image relative to other ones of the multiple gallery images.

12. The method of claim 1, wherein determining the body similarity score comprises:
determining whether either a body of the person-of-interest is absent from the query image or a body of the potential person-of-interest is absent from the gallery image; and
if so, determining the body similarity score to be a default body similarity score.

13. The method of claim 12, wherein the default face similarity score comprises a median of body similarity scores determined for the query image relative to other ones of the multiple gallery images.

14. The method of claim 1, wherein, prior to determining the fused similarity score, the method further comprises adjusting at least one of the face similarity score and the body similarity score based on an image quality metric of one or more of the query image and the gallery image.

15. The method of claim 14, wherein the image quality metric comprises an image resolution.

16. The method of claim 1, wherein, prior to determining the fused similarity score, the method further comprises adjusting at least one of the face similarity score and the body similarity score based on time data associated with one or more of the query image and the gallery image.

17. The method of claim 16, wherein the time data is indicative of when one or more of the query image and the gallery image were taken.

18. The method of claim 16, wherein the method further comprises:
determining whether the time data meets a criterion; and
if not, determining one or more of the face similarity score and the body similarity score to be one or more of a default face similarity score and a default body similarity score.

19. The method of claim 1, wherein the query image is part of a set of multiple query images, and wherein the method further comprises, prior to determining the fused similarity score, adjusting one or more of the face similarity score and the body similarity score based on:
a similarity of the query image relative to: a second query image of the multiple query images; or a second one of the multiple gallery images; and
a similarity of the second query image or the second gallery image relative to: a third query image of the multiple query images; or a third one of the multiple gallery images.

20. The method of claim 19 wherein the similarity comprises one or more of a face similarity score and a body similarity score.

21. A system for facilitating identification of a person-of-interest, comprising:
a display;
a processor; and
a memory communicatively coupled to the processor and having stored thereon computer program code executable by the processor and configured, when executed by the processor, to cause the processor to perform a method comprising:
for each of multiple gallery images:
determining a face similarity score of a query image relative to the gallery image, wherein the query image comprises at least a portion of a person-of-interest, and wherein the gallery image comprises at least a portion of a potential person-of-interest;
determining a body similarity score of the query image relative to the gallery image; and
determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest;
ranking the gallery images according to each fused similarity score of the respective gallery images; and
transmitting the gallery images for display on the display according to the ranking,
wherein at least one of:
(1) determining the face similarity score comprises:
determining whether either a face of the person-of-interest is absent from the query image or a face of the potential person-of-interest is absent from the gallery image; and
if so, determining the face similarity score to be a default face similarity score; and (2) determining the body similarity score comprises:
    determining whether either a body of the person-of-interest is absent from the query image or a body of the potential person-of-interest is absent from the gallery image; and
    if so, determining the body similarity score to be a default body similarity score.

22. The system of claim 21, wherein the method further comprises determining the relationship.

23. The system of claim 21, further comprising one or more video cameras communicatively coupled to the processor, wherein the processor is configured to receive from the one or more video cameras the query image and the multiple gallery images.

24. The system of claim 22, wherein determining the relationship comprises:
    determining reference face similarity scores and reference body similarity scores for pairs of multiple reference images, wherein each reference image comprises at least a portion of a reference person-of-interest; and
    determining, based on the reference face similarity scores and the reference body similarity scores, reference fused similarity scores by constraining the reference fused similarity scores as a function of whether or not the pairs of the reference images comprise at least portions of the same reference persons-of-interest; and
    determining the relationship based on the reference face similarity scores, the reference body similarity scores and the reference fused similarity scores.

25. The system of claim 24, wherein the computer program code is further executable by the processor and configured, when executed by the processor, to cause the processor to implement a machine learning process for performing one or more of: the determining the reference face similarity scores and the reference body similarity scores; the determining the reference fused similarity scores; and the determining the relationship.

26. The system of claim 25, wherein implementing the machine learning process comprises implementing a neural network to which are input the multiple reference images.

27. The system of claim 26, wherein the neural network is a multi-layer, soft-max neural network.

28. The system of claim 21, wherein determining one or more of the face similarity score and the body similarity score comprises:
    using a convolutional neural network to determine one or more similarity signatures between the query image and the gallery image; and
    determining one or more separations between the one or more similarity signatures, wherein one or more of the face similarity score and the body similarity score are a function of the one or more separations.

29. The system of claim 21, wherein the at least a portion of the person-of-interest comprises at least a portion of: a body of the person-of-interest; a torso of the person-of-interest;
    a face of the person-of-interest; and a body and a face of the person-of-interest.

30. The system of claim 21, wherein the at least a portion of the potential person-of-interest comprises at least a portion of: a body of the potential person-of-interest; a torso of the potential person-of-interest; a face of the potential person-of-interest; and a body and a face of the potential person-of-interest.

31. The system of claim 21, wherein determining the face similarity score comprises:
    determining whether either a face of the person-of-interest is absent from the query image or a face of the potential person-of-interest is absent from the gallery image; and
    if so, determining the face similarity score to be a default face similarity score.

32. The system of claim 31, wherein the default face similarity score comprises a median of face similarity scores determined for the query image relative to other ones of the multiple gallery images.

33. The system of claim 21, wherein determining the body similarity score comprises:
    determining whether either a body of the person-of-interest is absent from the query image or a body of the potential person-of-interest is absent from the gallery image; and
    if so, determining the body similarity score to be a default body similarity score.

34. The system of claim 33, wherein the default face similarity score comprises a median of body similarity scores determined for the query image relative to other ones of the multiple gallery images.

35. The system of claim 21, wherein, prior to determining the fused similarity score, the method further comprises adjusting at least one of the face similarity score and the body similarity score based on an image quality metric of one or more of the query image and the gallery image.

36. The system of claim 35, wherein the image quality metric comprises an image resolution.

37. The system of claim 21, wherein, prior to determining the fused similarity score, the method further comprises adjusting at least one of the face similarity score and the body similarity score based on time data associated with one or more of the query image and the gallery image.

38. The system of claim 37, wherein the time data is indicative of when one or more of the query image and the gallery image were taken.

39. The system of claim 37, wherein the method further comprises:
    determining whether the time data meets a criterion; and
    if not, determining one or more of the face similarity score and the body similarity score to be one or more of a default face similarity score and a default body similarity score.

40. The system of claim 21, wherein the query image is part of a set of multiple query images, and wherein the method further comprises, prior to determining the fused similarity score, adjusting one or more of the face similarity score and the body similarity score based on:
    a similarity of the query image relative to: a second query image of the multiple query images; or a second one of the multiple gallery images; and
    a similarity of the second query image or the second gallery image relative to: a third query image of the multiple query images; or a third one of the multiple gallery images.

41. The system of claim 40 wherein the similarity comprises one or more of a face similarity score and a body similarity score.

42. A system for facilitating identification of a person-of-interest, comprising:
    a client device comprising a display;
    one or more video cameras for recording a query image and multiple gallery images, wherein the query image comprises at least a portion of a person-of-interest, and wherein the gallery image comprises at least a portion of a potential person-of-interest; and a server communicatively coupled to the client device and the one or more video cameras, wherein the server comprises:

a processor; and a memory communicatively coupled to the processor and having stored thereon computer program code executable by the processor and configured, when executed by the processor, to cause the processor to perform a search method, wherein the server is configured to:

receive from the client device a request to facilitate identification of the person-of-interest; and in response thereto, cause the processor to execute the computer program code so as to perform the search method, wherein the search method comprises:

for each of the multiple gallery images:

determining a face similarity score of the query image relative to the gallery image;

determining a body similarity score of the query image relative to the gallery image; and determining a fused similarity score of the query image relative to the gallery image by applying a relationship between the face similarity score, the body similarity score, and the fused similarity score, wherein the fused similarity score is indicative of whether or not the person-of-interest and the potential person-of-interest are the same person-of-interest;

ranking the gallery images according to each fused similarity score of the respective gallery images; and transmitting the gallery images to the client device for display on the display according to the ranking, wherein at least one of:

(1) determining the face similarity score comprises:

determining whether either a face of the person-of-interest is absent from the query image or a face of the potential person-of-interest is absent from the gallery image; and if so, determining the face similarity score to be a default face similarity score; and (2) determining the body similarity score comprises:

determining whether either a body of the person-of-interest is absent from the query image or a body of the potential person-of-interest is absent from the gallery image; and if so, determining the body similarity score to be a default body similarity score.

* * * * *